United States Patent
Ohno et al.

(10) Patent No.: US 11,666,966 B2
(45) Date of Patent: Jun. 6, 2023

(54) POWDER MOLDING PRESS METHOD OF GREEN COMPACT FOR CUTTING INSERT, AND POWDER MOLDING PRESS DEVICE

(71) Applicant: MITSUBISHI MATERIALS CORPORATION, Tokyo (JP)

(72) Inventors: Kentaro Ohno, Tokyo (JP); Masaru Hotta, Tokyo (JP); Tomotsugu Gouda, Tokyo (JP); Yoshitomo Shibuya, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 553 days.

(21) Appl. No.: 16/617,746

(22) PCT Filed: May 29, 2018

(86) PCT No.: PCT/JP2018/020499
§ 371 (c)(1),
(2) Date: Nov. 27, 2019

(87) PCT Pub. No.: WO2018/221497
PCT Pub. Date: Dec. 6, 2018

(65) Prior Publication Data
US 2020/0188997 A1    Jun. 18, 2020

(30) Foreign Application Priority Data

May 29, 2017  (JP) .............................. JP2017-105548
May 29, 2017  (JP) .............................. JP2017-105549

(51) Int. Cl.
B22F 3/03       (2006.01)
B30B 11/02      (2006.01)
(Continued)

(52) U.S. Cl.
CPC .............. *B22F 3/03* (2013.01); *B30B 11/027* (2013.01); *B22F 5/10* (2013.01);
(Continued)

(58) Field of Classification Search
CPC ........................................................ B22F 3/03
See application file for complete search history.

(56) References Cited

U.S. PATENT DOCUMENTS

2009/0169412 A1   7/2009  Samuelsson et al.
2012/0051851 A1   3/2012  Saito et al.
2013/0039798 A1   2/2013  Satran et al.

FOREIGN PATENT DOCUMENTS

CN    101128311 A    2/2008
CN    104209519 A   12/2014
(Continued)

OTHER PUBLICATIONS

Espacenet machine translation of JP H11-156606 A retrieved on Jan. 31, 2022 (Year: 1999).*

(Continued)

*Primary Examiner* — Jophy S. Koshy
*Assistant Examiner* — Joshua S Carpenter
(74) *Attorney, Agent, or Firm* — Locke Lord LLP

(57) ABSTRACT

A powder molding press method of a green compact for a cutting insert including: filling a molding space with raw material powder in a state where a lower punch is inserted from below into a hole portion of a die; performing preliminary molding by inserting an upper punch for preliminary molding including a preliminary molding surface having a shape different from a shape obtained by inverting the upper surface of the green compact for a cutting insert in a plane symmetry into the molding space from above such that a thick portion between the upper and lower surfaces in the direction of the insert center line is filled with more raw (Continued)

material powder than a thin portion therebetween, relative to a state before the step of performing the preliminary molding; and inserting an upper punch for final molding into the molding space from above to powder-molding-press the raw material powder.

2 Claims, 22 Drawing Sheets

(51) Int. Cl.
  *B22F 5/10* (2006.01)
  *B22F 5/00* (2006.01)
(52) U.S. Cl.
  CPC ... *B22F 2003/033* (2013.01); *B22F 2005/001* (2013.01); *F16C 2220/20* (2013.01)

(56) References Cited

FOREIGN PATENT DOCUMENTS

| | | | | |
|---|---|---|---|---|
| CN | 204449289 U | 7/2015 | | |
| EP | 2123435 A1 | 11/2009 | | |
| EP | 2933041 A1 | 10/2015 | | |
| EP | 3015196 A1 | 5/2016 | | |
| JP | S55-131101 A | 10/1980 | | |
| JP | H06-330106 A | 11/1994 | | |
| JP | H11-156606 A | * | 6/1999 | ............ B23B 27/04 |
| JP | 2000-326100 A | 11/2000 | | |
| JP | 2010-528876 A | 8/2010 | | |
| JP | 4573212 B2 | * | 11/2010 | |
| JP | 2011-508827 A | 3/2011 | | |
| JP | 2015-000429 A | 1/2015 | | |
| JP | 2015-201568 A | 11/2015 | | |
| KR | 10-2011-0135928 A | 12/2011 | | |
| KR | 10-2014-0047700 A | 4/2014 | | |
| WO | 2008/114827 A1 | 9/2008 | | |
| WO | 2008/153227 A1 | 12/2008 | | |
| WO | 2016/066454 A1 | 5/2016 | | |

OTHER PUBLICATIONS

Espacenet machine translation of JP4573212B2 retrieved on Jun. 9, 2022 (Year: 2010).*
Office Action dated Apr. 30, 2021, issued for Chinese Patent Application No. 201880034474.4 and English translation of the Search Report.
International Search Report dated Aug. 14, 2018, issued for PCT/JP2018/020499 and English translation thereof.
Office Action dated Mar. 20, 2018, issued for Japanese patent application No. 2017-105548 and English translation thereof.
Office Action dated Feb. 27, 2018, issued for Japanese patent application No. 2017-105549 and English translation thereof.
Andrej Salak et al., "Ferrous Powder Metallurgy", In: "Ferrous Powder Metallurgy", Cambridge International Science Publishing, Galliard (Printers) Ltd, Gt Yarmouth, England, Dec. 1, 1995, p. 77 and information sheet, (cited in the Sep. 1, 2020 Search Report issued for EP18810200.8).
Supplementary Euroepan Search Report dated Sep. 1, 2020, issued for European Application No. 18810200.8.
Notice of Allowance dated Sep. 1, 2022, issued for Korean Patent Application No. 10-2019-7035210 and English translation thereof.

* cited by examiner

POWDER MOLDING PRESS METHOD OF GREEN COMPACT FOR CUTTING INSERT, AND POWDER MOLDING PRESS DEVICE

TECHNICAL FIELD

The present invention relates to a powder molding press method and a powder molding press device of a green compact for a cutting insert sintered to a cutting insert.

Priority is claimed on Japanese Patent Application Nos. 2017-105548 and 2017-105549, filed on May 29, 2017, the contents of which are incorporated herein by reference.

BACKGROUND ART

As a powder molding press method and a powder molding press device of a green compact for a cutting insert, for example, as described in Patent Document 1, generally, a molding space formed by a die, an upper punch, and a lower punch is filled with a raw material powder of a green compact for a cutting insert, and the upper punch and the lower punch compresses the raw material powder to perform powder molding press. In the green compact for a cutting insert which is powder-molding-pressed in the way, upper and lower surfaces of the green compact are formed in a shape obtained by inverting a lower end surface of the upper punch and an upper end surface of the lower punch in a plane symmetry, the green compact is sintered to be shrunk to have a substantially similar shape, and thus, a cutting insert is manufactured.

CITATION LIST

Patent Literature

[Patent Document 1] PCT International Publication No. WO2008/114827

DISCLOSURE OF INVENTION

Technical Problem

Meanwhile, the cutting insert described in Patent Document 1 has a polygonal flat plate shape, upper and lower surfaces of the cutting insert are also substantially planar, and thus, the upper and lower surfaces of the green compact for a cutting insert which is powder-molding-pressed are also substantially planar. However, in recent years, for example, as described in Japanese Patent No. 5715688, a cutting insert in which upper and lower surfaces thereof are not planar but largely uneven is manufactured. Accordingly, upper and lower surfaces of a green compact for a cutting insert sintered to the cutting insert are also largely uneven, and thus, the green impact has a shape in which thicknesses between the upper and lower surfaces are partially different from each other.

Moreover, if the green compact for a cutting insert is powder-molding-pressed by the die, the upper punch including the lower end surface having the shape obtained by inverting the upper surface of the green compact for a cutting insert in a plane symmetry, and the lower punch including the upper end surface having the shape obtained by inverting the lower surface thereof in a plane symmetry, as described above, a density of a raw material powder in the green compact for a cutting insert is dense in a portion of the green compact for a cutting insert having a thin thickness between the upper and lower surfaces thereof, the density of the raw material powder is spare in a thick portion, and thus, dispersion occurs in the density of the raw material powder. Accordingly, if the green compact for a cutting insert is sintered, strain or deformation is generated in the cutting insert due to the dispersion in the density of the raw material powder.

Solution to Problem

The present invention is made in consideration of the above-described background, and an objective thereof is to provide a powder molding press method and a powder molding press device of a green compact for a cutting insert capable of limiting the occurrence of dispersion in a density of a raw material powder when the green compact for a cutting insert sintered to the cutting insert having largely uneven upper and lower surfaces and partially different thicknesses between the upper and lower surfaces is powder-molding-pressed, and preventing strain or deformation even when the green compact for a cutting insert is sintered to the cutting insert.

In order to solve the above problem and achieve the objective, the present invention includes the following aspects.

(1) A powder molding press method of a green compact for a cutting insert to be sintered to the cutting insert including an upper and lower surfaces directed in a direction of an insert center line of the cutting insert and a side surface disposed around the upper and lower surfaces and having partially different thicknesses between the upper and lower surfaces in the direction of the insert center line, the method including the steps of:

in a state where a lower punch having a lower surface molding surface molding the lower surface of the green compact for a cutting insert as an upper end surface of the lower punch is inserted from below into a hole portion of a die having a side surface molding surface molding the side surface of the green compact for a cutting insert as an inner peripheral surface of the die, filling a molding space formed by the lower surface molding surface and the side surface molding surface with a raw material powder of the green compact for a cutting insert;

performing a preliminary molding by inserting an upper punch for preliminary molding including a preliminary molding surface having a shape different from a shape obtained by inverting the upper surface of the green compact for a cutting insert in plane symmetry as a lower end surface of the upper punch for preliminary molding into the molding space from above such that a thick portion between the upper and lower surfaces in the direction of the insert center line is filled with more raw material powder than a thin portion therebetween, relative to a state before the step of performing the preliminary molding; and inserting an upper punch for final molding having an upper surface molding surface molding the upper surface of the green compact for a cutting insert as a lower end surface of the upper punch for final molding into the molding space from above such that the raw material powder is powder-molding-pressed to the green compact for a cutting insert.

(2) The powder molding press method of a green compact for a cutting insert according to (1), in which a downward protrusion amount of the preliminary molding surface of the upper punch for preliminary molding is larger than a downward protrusion amount of the upper surface molding surface of the upper punch for final molding in the thin portion between the upper and lower surfaces in the green compact for a cutting insert in the direction of the insert center line, and by insertion of the upper punch for preliminary molding, the preliminary molding is performed such that the thick portion between the upper and lower surfaces in the direction of the insert center line is filled with more raw material powder than the thin portion therebetween, relative to the state before the step of performing the preliminary molding.

(3) The powder molding press method of a green compact for a cutting insert according to (2), in which the preliminary molding surface of the upper punch for preliminary molding is provided with an inclined surface protruding downward toward the thin portion between the upper and lower surfaces in the green compact for a cutting insert in the direction of the insert center line, and by guiding the raw material powder by the inclined surface, the preliminary molding is performed such that the thick portion between the upper and lower surfaces in the direction of the insert center line is filled with more raw material powder than the thin portion therebetween, relative to the state before the step of performing the preliminary molding.

(4) A powder molding press device of a green compact for a cutting insert to be sintered to the cutting insert including an upper and lower surfaces directed in a direction of an insert center line of the cutting insert and a side surface disposed around the upper and lower surfaces and having partially different thicknesses between the upper and lower surfaces in the direction of the insert center line, the device including:

a lower punch which has a lower surface molding surface molding the lower surface of the green compact for a cutting insert as an upper end surface of the lower punch;

a die which has a side surface molding surface molding the side surface of the green compact for a cutting insert as an inner peripheral surface of the die and a hole portion into which the lower punch is inserted from below;

an upper punch for preliminary molding which has a preliminary molding surface having a shape different from a shape obtained by inverting the upper surface of the green compact for a cutting insert in plane symmetry as a lower end surface of the upper punch for preliminary molding and is inserted into a molding space formed by the lower surface molding surface and the side surface molding surface from above, the upper punch for preliminary molding performing a preliminary molding to raw material powder of the green compact for a cutting insert filling the molding space such that a thick portion between the upper and lower surfaces in the direction of the insert center line is filled with more raw material powder than a thin portion therebetween, relative to a state before the step of performing the preliminary molding; and an upper punch for final molding which has an upper surface molding surface molding the upper surface of the green compact for a cutting insert as a lower end surface of the upper punch for final molding and is inserted into the molding space from above to powder-molding-press the raw material powder which is performed the preliminary molding by the upper punch for preliminary molding and more fills the thick portion between the upper and lower surfaces in the direction of the insert center line than the thin portion, relative to the state before the step of performing the preliminary molding, to the green compact for a cutting insert.

(5) The powder molding press device of a green compact for a cutting insert according to (4), in which a downward protrusion amount of the preliminary molding surface of the upper punch for preliminary molding is larger than a downward protrusion amount of the upper surface molding surface of the upper punch for final molding in the thin portion between the upper and lower surfaces in the green compact for a cutting insert in the direction of the insert center line.

(6) The powder molding press device of a green compact for a cutting insert according to (5), in which the preliminary molding surface of the upper punch for preliminary molding is provided with an inclined surface protruding downward toward the thin portion between the upper and lower surfaces in the green compact for a cutting insert in the direction of the insert center line.

(1A) A powder molding press method of a green compact for a cutting insert to be sintered to the cutting insert including an upper and lower surfaces directed in a direction of an insert center line of the cutting insert and a side surface disposed around the upper and lower surfaces and having partially different thicknesses between the upper and lower surfaces in the direction of the insert center line, the method including the steps of:

in a state where a lower punch having a lower surface molding surface molding the lower surface of the green compact for a cutting insert as an upper end surface of the lower punch is inserted from below into a hole portion of a die having a side surface molding surface molding the side surface of the green compact for a cutting insert as an inner peripheral surface of the die, filling a molding space formed by the lower surface molding surface and the side surface molding surface with a raw material powder of the green compact for a cutting insert;

performing a preliminary molding by inserting an upper punch for preliminary molding including a preliminary molding surface having a shape different from a shape obtained by inverting the upper surface of the green compact for a cutting insert in plane symmetry as a lower end surface of the upper punch for preliminary molding into the molding space from above such that a thick portion between the upper and lower surfaces in the green compact for a cutting insert in the direction of the insert center line is filled with more raw material powder, relative to a state before the step of performing the preliminary molding, to move the raw material powder from a thin portion therebetween; and inserting an upper punch for final molding having an upper surface molding surface molding the upper surface of the green compact for a cutting insert as a lower end surface of the upper punch for final molding into the molding space from above such that the raw material powder is powder-molding-pressed to the green compact for a cutting insert.

(2A) The powder molding press method of a green compact for a cutting insert according to (1A), in which a downward protrusion amount of the preliminary molding surface of the upper punch for preliminary molding is larger than a downward protrusion amount of the upper surface molding surface of the upper punch for final molding in the thin portion between the upper and lower surfaces in the green compact for a cutting insert in the direction of the insert center line, and by insertion of the upper punch for preliminary molding, the preliminary molding is performed such that the thick portion between the upper and lower surfaces in the green compact for a cutting insert in the direction of the insert center line is filled with more raw material powder, relative to a state before the step of performing the preliminary molding, to move the raw material powder from the thin portion therebetween.

(3A) The powder molding press method of a green compact for a cutting insert according to (2A), in which the preliminary molding surface of the upper punch for preliminary molding is provided with an inclined surface protruding downward toward the thin portion between the upper and lower surfaces in the green compact for a cutting insert in the direction of the insert center line, and by guiding the raw material powder by the inclined surface, the preliminary molding is performed such that the thin portion between the upper and lower surfaces in the green compact for a cutting insert in the direction of the insert center line is filled with more raw material powder, relative to a state before the step of performing the preliminary molding, to move the raw material powder from the thin portion therebetween.

(4A) A powder molding press device of a green compact for a cutting insert to be sintered to the cutting insert including an upper and lower surfaces directed in a direction of an insert center line of the cutting insert and a side surface disposed around the upper and lower surfaces and having partially different thicknesses between the upper and lower surfaces in the direction of the insert center line, the device including:

a lower punch which has a lower surface molding surface molding the lower surface of the green compact for a cutting insert as an upper end surface of the lower punch;

a die which has a side surface molding surface molding the side surface of the green compact for a cutting insert as an inner peripheral surface of the die and a hole portion into which the lower punch is inserted from below;

an upper punch for preliminary molding which has a preliminary molding surface having a shape different from a shape obtained by inverting the upper surface of the green compact for a cutting insert in plane symmetry as a lower end surface of the upper punch for preliminary molding and is inserted into a molding space formed by the lower surface molding surface and the side surface molding surface from above, the upper punch for preliminary molding performing a preliminary molding to raw material powder of the green compact for a cutting insert filling the molding space such that a thick portion between the upper and lower surfaces in the green compact of the cutting insert in the direction of the insert center line is filled with more raw material powder, relative to a state before the step of performing the preliminary molding, to move the raw material powder from a thin portion therebetween by the preliminary molding surface; and an upper punch for final molding which has an upper surface molding surface molding the upper surface of the green compact for a cutting insert as a lower end surface of the upper punch for final molding and is inserted into the molding space from above to powder-molding-press the raw material powder which is performed the preliminary molding by the upper punch for preliminary molding and more fills the thick portion between the upper and lower surfaces in the green compact for a cutting insert in the direction of the insert center line than the thin portion therebetween, relative to the state before the step of performing the preliminary molding, to the green compact for a cutting insert.

(5A) The powder molding press device of a green compact for a cutting insert according to (4A), a downward protrusion amount of the preliminary molding surface of the upper punch for preliminary molding is larger than a downward protrusion amount of the upper surface molding surface of the upper punch for final molding in the thin portion between the upper and lower surfaces in the green compact for a cutting insert in the direction of the insert center line.

(6A) The powder molding press device of a green compact for a cutting insert according to (5A), the preliminary molding surface of the upper punch for preliminary molding is provided with an inclined surface protruding downward toward the thin portion between the upper and lower surfaces in the green compact for a cutting insert in the direction of the insert center line.

In the powder molding press method and the powder molding press device of the green compact for a cutting insert according to (1) to (6A), before the upper punch for final molding having the upper surface molding surface molding the upper surface of the green compact for a cutting insert by the shape obtained by inverting the upper surface of the green compact for a cutting insert in plane symmetry as the lower end surface of the upper punch for final molding is inserted into the molding space, the upper punch for preliminary molding including the preliminary molding surface having the shape different from the shape obtained by inverting the upper surface of the green compact for a cutting insert in plane symmetry, that is, the shape different from the upper surface molding surface of the upper punch for final molding is inserted into the molding space to perform the preliminary molding to the raw material powder filling the molding space, and thus, the thick portion between the upper and lower surfaces in the direction of the insert center line is filled with more raw material powder than the thin portion therebetween, relative to the state before the step of performing the preliminary molding.

Therefore, when the raw material powder performed the preliminary molding in this way is powder-molding-pressed to the green compact for a cutting insert having a predetermined dimension and shape by the upper punch for final molding, the thick portion between the upper and lower surfaces in the direction of the insert center line is filled with more raw material powder relative to the state before the step of performing the preliminary molding, the thin portion between the upper and lower surfaces in the direction of the insert center line is filled with the raw material powder smaller than the raw material powder filling the thick portion, and thus, in the green compact for a cutting insert which is finally powder-molding-pressed, the density of the raw material powder can be made uniform. Accordingly, in the cutting insert which is manufactured by sintering the green compact for a cutting insert in this way, it is possible to limit the occurrence of strain or deformation.

Here, in this way, in order to perform the preliminary molding by the upper punch for preliminary molding such that the thick portion between the upper and lower surfaces in the direction of the insert center line is filled with more raw material powder than the thin portion therebetween, relative to the state before the step of performing the preliminary molding, the preliminary molding surface of the upper punch for preliminary molding may be formed to have a downward protrusion amount larger than that of the upper surface molding surface of the upper punch for final molding in the thin portion between the upper and lower surfaces in the green compact for a cutting insert in the direction of the insert center line such that the raw material powder filling the thin portion is extruded by the preliminary molding surface having a large protrusion amount so as to move to the thick portion.

Moreover, in this case, the preliminary molding surface of the upper punch for preliminary molding is provided with the inclined surface which protrudes downward toward the thin portion between the upper and lower surfaces in the green compact for a cutting insert in the direction of the insert center line. Accordingly, by guiding the raw material powder by the inclined surface, if the preliminary molding is performed such that the thick portion between the upper and lower surfaces in the direction of the insert center line is filled with more raw material powder than the thin portion therebetween, relative to the state before the step of performing the preliminary molding, the raw material powder can be smoothly extruded from the thin portion between the upper and lower surfaces in the green compact for a cutting insert in the direction of the insert center line to the thick portion.

(7) The powder molding press method of a green compact for a cutting insert according to (1), further including the steps of:

after performing the filling of the raw material powder of the green compact for a cutting insert, inserting the upper punch for preliminary molding having the preliminary molding surface, which has a direction of an unevenness opposite to that of the shape obtained by inverting the upper surface of the green compact for a cutting insert in plane symmetry, as the lower end surface of the upper punch for preliminary molding into the molding space from above to perform a preliminary molding the raw material powder;

refilling a space above the raw material powder after the step of performing the preliminary molding with a raw material powder such that the thick portion between the upper and lower surfaces in the direction of the insert center line is filled with more raw material powder than the thin portion therebetween, relative to the state before the step of performing the preliminary molding; and inserting the upper punch for final molding having the upper surface molding surface molding the upper surface of the green compact for a cutting insert as the lower end surface of the upper punch for final molding into the molding space from above such that the raw material powder after the step of performing the preliminary molding and the refilled raw material powder are powder-molding-pressed to the green compact for a cutting insert.

(8) The powder molding press method of a green compact for a cutting insert according to (7), in which the preliminary molding surface of the upper punch for preliminary molding is provided with an inclined surface protruding downward toward the thick portion between the upper and lower surfaces in the green compact for a cutting insert in the direction of the insert center line from the thin portion therebetween, and by compressing the raw material powder filled in advance by the inclined surface, the preliminary molding is performed such that the thick portion between the upper and lower surfaces in the direction of the insert center line is refilled with more raw material powder than the thin portion therebetween, relative to the state before the step of performing the preliminary molding.

(9) A powder molding press device of a green compact for a cutting insert to be sintered to the cutting insert including an upper and lower surfaces directed in a direction of an insert center line of the cutting insert and a side surface disposed around the upper and lower surfaces and having partially different thicknesses between the upper and lower surfaces in the direction of the insert center line, the device including:

a lower punch which has a lower surface molding surface molding the lower surface of the green compact for a cutting insert as an upper end surface of the lower punch;

a die which has a side surface molding surface molding the side surface of the green compact for a cutting insert as an inner peripheral surface of the die and a hole portion into which the lower punch is inserted from below;

an upper punch for preliminary molding which has a preliminary molding surface having a direction of an unevenness opposite to that of a shape obtained by inverting the upper surface of the green compact for a cutting insert in plane symmetry as a lower end surface of the upper punch for preliminary molding and is inserted into a molding space formed by the lower surface molding surface and the side surface molding surface from above so as to perform a preliminary molding the raw material powder of the green compact for a cutting insert filling the molding space; and an upper punch for final molding which has an upper surface molding surface molding the upper surface of the green compact for a cutting insert as a lower end surface of the upper punch for final molding and is inserted into the molding space from above to powder-molding-press the raw material powder after the step of performing the preliminary molding and a raw material powder refilling a space above the raw material powder after the step of performing the preliminary molding to the green compact for a cutting insert.

(10) The powder molding press device of a green compact for a cutting insert according to (9), in which the preliminary molding surface of the upper punch for preliminary molding is provided with an inclined surface protruding downward toward the thick portion between the upper and lower surfaces in the green compact for a cutting insert in the direction of the insert center line from the thin portion therebetween.

(7A) A powder molding press method of a green compact for a cutting insert to be sintered to the cutting insert including an upper and lower surfaces directed in a direction of an insert center line of the cutting insert and a side surface disposed around the upper and lower surfaces and having partially different thicknesses between the upper and lower surfaces in the direction of the insert center line, the method including:

in a state where a lower punch having a lower surface molding surface molding the lower surface of the green compact for a cutting insert as an upper end surface of the lower punch is inserted from below into a hole portion of a die having a side surface molding surface molding the side surface of the green compact for a cutting insert as an inner peripheral surface of the die, filling a molding space formed by the lower surface molding surface and the side surface molding surface with a raw material powder of the green compact for a cutting insert;

inserting an upper punch for preliminary molding having a preliminary molding surface, which has a direction of an unevenness opposite to that of a shape obtained by inverting the upper surface of the green compact for a cutting insert in plane symmetry, as a lower end surface of the upper punch for preliminary molding into the molding space from above such that the lower end portion is fitted into the hole portion of the die to perform the preliminary molding the raw material powder;

refilling a space above the raw material powder after the step of performing the preliminary molding with a raw material powder such that the thick portion between the upper and lower surfaces in the direction of the insert center line is filled with more raw material powder than the thin portion therebetween, relative to the state before the step of performing the preliminary molding, and inserting an upper punch for final molding having an upper surface molding surface molding the upper surface of the green compact for a cutting insert as a lower end surface of the upper punch for final molding into the molding space from above such that the raw material powder after the step of performing the preliminary molding and the refilled raw material powder are powder-molding-pressed to the green compact for a cutting insert.

(8A) The powder molding press method of a green compact for a cutting insert according to (7A), in which the preliminary molding surface of the upper punch for preliminary molding having a direction of an unevenness opposite to that of the shape obtained by inverting the upper surface of the green compact for a cutting insert in plane symmetry is provided with an inclined surface protruding downward toward the thick portion between the upper and lower surfaces in the green compact for a cutting insert in the direction of the insert center line from the thin portion therebetween, and in which by compressing the raw material powder filled in advance by the inclined surface, the preliminary molding is performed such that the thick portion between the upper and lower surfaces in the direction of the insert center line is refilled with more raw material powder than the thin portion therebetween, relative to the state before the step of performing the preliminary molding.

(9A) A powder molding press device of a green compact for a cutting insert to be sintered to the cutting insert including an upper and lower surfaces directed in a direction of an insert center line of the cutting insert and a side surface disposed around the upper and lower surfaces and having partially different thicknesses between the upper and lower surfaces in the direction of the insert center line, the device including:

a lower punch which has a lower surface molding surface molding the lower surface of the green compact for a cutting insert as an upper end surface of the lower punch;

a die which has a side surface molding surface molding the side surface of the green compact for a cutting insert as an inner peripheral surface of the die and a hole portion into which the lower punch is inserted from below;

an upper punch for preliminary molding which has a preliminary molding surface having a direction of an unevenness opposite to that of a shape obtained by inverting the upper surface of the green compact for a cutting insert in plane symmetry as a lower end surface of the upper punch for preliminary molding and is inserted into a molding space formed by the lower surface molding surface and the side surface molding surface from above such that the lower end portion is fitted into the hole portion of the die so as to perform a preliminary molding to the raw material powder of the green compact for a cutting insert filling the molding space; and an upper punch for final molding which has an upper surface molding surface molding the upper surface of the green compact for a cutting insert as a lower end surface of the upper punch for final molding and is inserted into the molding space from above to powder-molding-press the raw material powder after the step of performing the preliminary molding and a raw material powder refilling a space above the raw material powder after the step of performing the preliminary molding to the green compact for a cutting insert.

(10A) The powder molding press device of a green compact for a cutting insert according to (9A), in which the preliminary molding surface of the upper punch for preliminary molding having a direction of an unevenness opposite to that of the shape obtained by inverting the upper surface of the green compact for a cutting insert in plane symmetry is provided with an inclined surface protruding downward toward the thick portion between the upper and lower surfaces in the green compact for a cutting insert in the direction of the insert center line from the thin portion therebetween.

In the powder molding press method and the powder molding press device of the green compact for a cutting insert according to (7) to (10A), before the upper punch for final molding having the upper surface molding surface molding the upper surface of the green compact for a cutting insert by the shape obtained by inverting the upper surface of the green compact for a cutting insert in plane symmetry as the lower end surface of the upper punch for final molding is inserted into the molding space, the upper punch for preliminary molding having the preliminary molding surface which has the direction of the unevenness opposite to that of the shape obtained by inverting the upper surface of the green compact for a cutting insert in plane symmetry, that is, has the direction of the unevenness opposite to that of the upper surface molding surface of the upper punch for final molding is inserted into the molding space to perform the preliminary molding to the raw material powder.

Therefore, according to the preliminary molding, in a depth of the upper surface of the raw material powder in the molding space, the thick portion between the upper and lower surfaces in the green compact for a cutting insert in the direction of the insert center line is deeper than the thin portion.

Therefore, by refilling a space above the raw material powder after the step of performing the preliminary molding with the raw material powder, the portion where the upper surface of the raw material powder becomes deeper, that is, the thick portion between the upper and lower surfaces of the green compact for a cutting insert in the direction of the insert center line is refilled with more raw material powder than the thin portion therebetween, relative to the state before the step of performing the preliminary molding.

Accordingly, in this way, when the raw material powder after the step of performing the preliminary molding and the refilled raw material powder are powder-molding-pressed to the green compact for a cutting insert having a predetermined dimension and shape by the upper punch for final molding and the lower punch, the thick portion between the upper and lower surfaces in the direction of the insert center line is filled with more raw material powder, the thin portion between the upper and lower surfaces in the direction of the insert center line is filled with the raw material powder smaller than the raw material powder filling the thick portion, and thus, in the green compact for a cutting insert which is finally powder-molding-pressed, the density of the raw material powder can be made uniform.

Accordingly, in the cutting insert which is manufactured by sintering the green compact for a cutting insert in this way, it is possible to limit the occurrence of strain or deformation.

Here, if the preliminary molding surface of the upper punch for preliminary molding is provided with the inclined surface protruding downward toward the thick portion between the upper and lower surfaces in the green compact for a cutting insert in the direction of the insert center line from the thin portion therebetween, and the preliminary molding is performed such that the thick portion between the upper and lower surfaces in the direction of the insert center line is refilled with more raw material powder than the thin portion therebetween, relative to the state before the step of performing the preliminary molding, by compressing the raw material powder is filled in advance by the inclined surface, it is possible to prevent a step from occurring from the thick portion between the upper and lower surfaces in the green compact for a cutting insert in the direction of the insert center line toward the thin portion in the upper surface of the raw material powder after the step of performing the preliminary molding, and in the green compact for a cutting insert which is refilled with the raw material powder and is powder-molding-pressed by the upper punch for final molding, the density of the raw material powder can be made uniform.

Advantageous Effects of Invention

As described above, according to the present embodiment, even in a case where a cutting insert having largely uneven upper and lower surfaces and partially different thicknesses in a direction of an insert center line is sintered and manufactured, a density of a raw material powder in the direction of the insert center line in a green compact for a cutting insert is uniform, it is possible to limit the occurrence of strain or deformation, and it is possible to manufacture the cutting insert having high precision and high quality.

BEST MODE FOR CARRYING OUT THE INVENTION

First Embodiment

Figure 1:
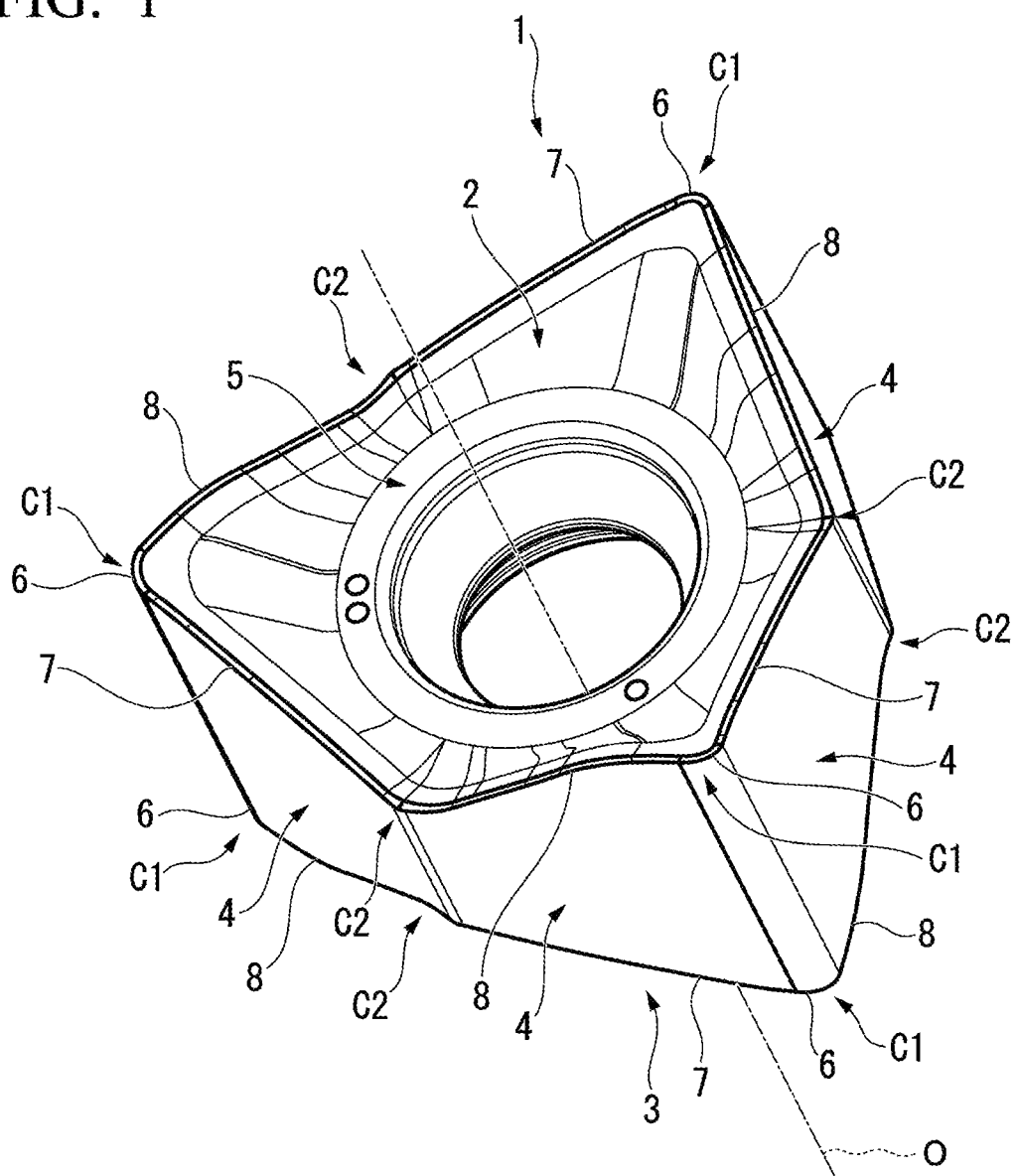
FIG. 1 is a perspective view showing a cutting insert manufactured by sintering a green compact for a cutting insert which is powder-molding-pressed according to first and second embodiments of a powder molding press method and a powder molding press device of the green compact for a cutting insert of the present invention.
Figure 2:
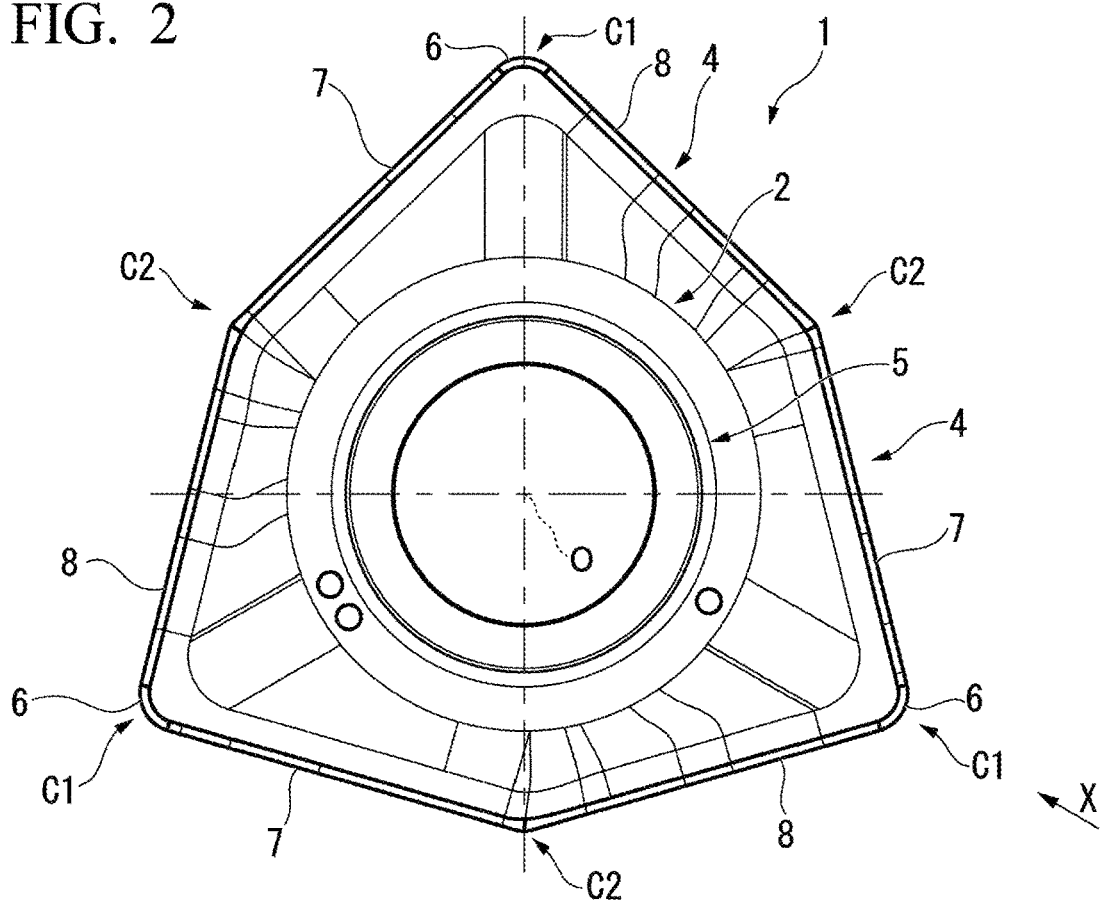
FIG. 2 is a plan view of the cutting insert shown in FIG. 1.
Figure 3:
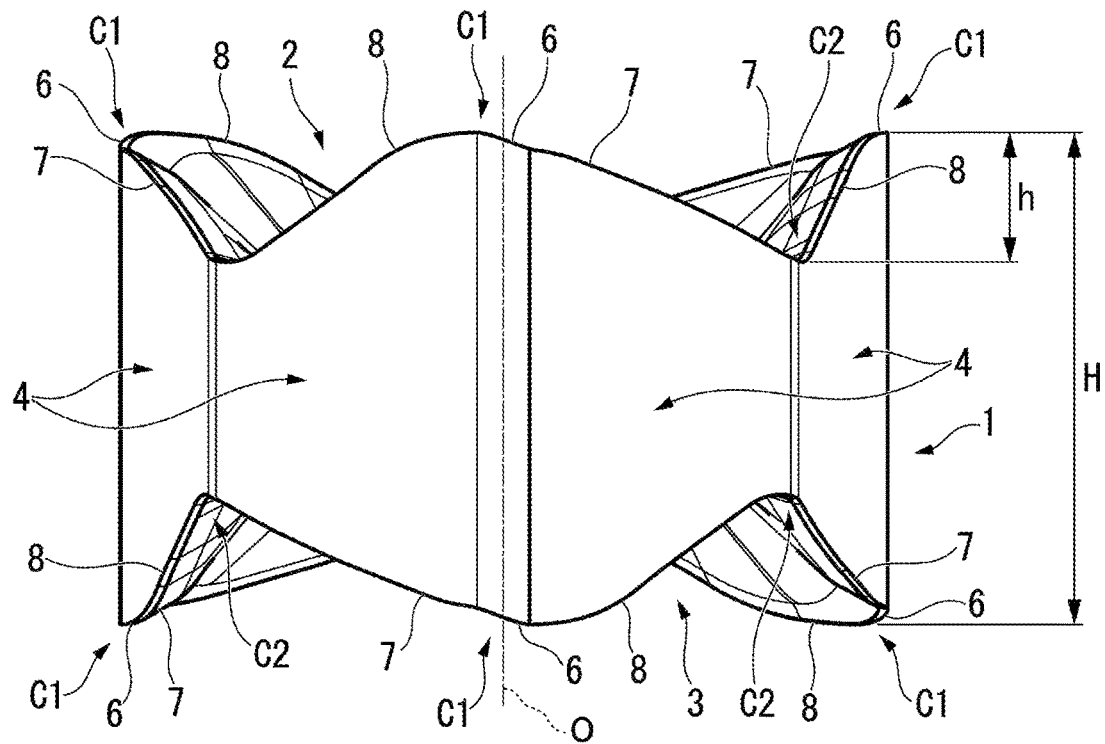
FIG. 3 is a side view when viewed in an arrow X direction in FIG. 2.

FIGS. 1 to 3 show a cutting insert manufactured by sintering a green compact for a cutting insert which is powder-molding-pressed according to first and second embodiments of a powder molding press method and a powder molding press device of the green compact for a cutting insert of the present invention. FIGS. 4 to 13 show a powder molding press device of the green compact for a cutting insert of an embodiment. The powder molding press method of the present embodiment will be also described with reference to FIGS. 4 to 13.

In a cutting insert obtained by sintering the green compact for a cutting insert which is powder-molding-pressed according to the present embodiment, as shown in FIGS. 1 and 2, an insert body 1 is formed of a hard material such as cemented carbide, cermet, or ceramics to have an uneven hexagonal plate shape and includes upper and lower surfaces 2 and 3 formed in an uneven hexagonal shape and six side surfaces 4 which are disposed around the upper and lower surfaces 2 and 3. A fitting hole 5 which penetrates the insert body 1 and has a circular cross section is open at centers of the upper and lower surfaces 2 and 3, and a center line of the fitting hole 5 is an insert center line O in the cutting insert.

The insert body 1 has a rotationally symmetrical shape by 120° around the insert center line O, and has front/back inverted symmetrical shapes with respect to upper and lower surfaces 2 and 3. Here, in the upper and lower surfaces 2 and 3, an annular flat surface portion perpendicular to the insert center line O is formed around an opening portion of the fitting hole 5, and this flat surface portion is a most concave portion in a direction of the insert center line O in the upper and lower surfaces 2 and 3 of the insert body 1 excluding an inside of the fitting hole 5.

Six corner portions of each of the upper and lower surfaces 2 and 3 include first corner portions C1 and second corner portions C2 which are alternately located in a circumferential direction, and in the upper and lower surfaces 2 and 3, the first corner portions C1 of the lower surface 3 are located on a side opposite to the first corner portions C1 of the upper surface 2 in the direction of the insert center line O, and the second corner portions C2 of the lower surface 3 are located on a side opposite to the second corner portions C2 of the upper surface 2 in the direction of the insert center line O.

Among them, a corner edge 6 having a convex curve shape such as a convex arc when viewed in the direction of the insert center line O is formed in each of the first corner portions C1, and a primary cutting edge 7 is formed from the corner edge 6 to the second corner portion C2 adjacent to one side (side in the counterclockwise direction in FIG. 2) of the first corner portion C1 in a circumferential direction of each of the upper and lower surfaces 2 and 3. In addition, a secondary cutting edge 8 is formed from the corner edge 6 to the second corner portion C2 adjacent to the other side (side in the clockwise direction in FIG. 2) which is a side opposite to the side to which the primary cutting edge 7 extends in the circumferential direction of each of the upper and lower surfaces 2 and 3.

In the cutting insert, one of the upper and lower surfaces 2 and 3 is a rake face, and the other thereof is an attachment surface to a bottom surface of an insert mounting seat of a cutting edge replacement type cutting tool (not shown). In addition, in a state where the attachment surface is in close contact with the bottom surface of the insert mounting seat, a clamp screw inserted into the fitting hole 5 from a side of the rake surface is screwed into a screw hole formed in the bottom surface, and thus, the cutting insert is detachably attached to the cutting edge replacement type cutting tool.

In addition, the cutting insert attached to the cutting edge replacement type cutting tool in this way cuts a work material by a continuous set of the corner edge 6, the primary cutting edge 7, and the secondary cutting edge 8 in one of the upper and lower surfaces 2 and 3 serving as the rake face. In addition, the side surfaces 4 are parallel to the insert center line O and are flank faces of the corner edges 6, the primary cutting edges 7, and the secondary cutting edges 8, that is, the cutting insert shown in FIGS. 1 to 3 is a negative type cutting insert.

In addition, each of the primary cutting edge 7 and the secondary cutting edge 8 is inclined to be recessed in the direction of the insert center line O as it goes from the corner edge 6 located at the first corner portion C1 toward the circumferentially adjacent second corner portion C2, and in the insert body 1, the first corner portion C1 is a most protruding portion in the direction of the insert center line O, and in an outer peripheral edge of each of the upper and lower surfaces 2 and 3, the second corner portion C2 is a most concave portion in the direction of the insert center line O. In addition, each of the upper and lower surfaces 2 and 3 is inclined to be gradually recessed in the direction of the insert center line O as it goes from the outer peripheral edge toward the flat surface portion around the opening portion of the fitting hole 5.

Moreover, as shown in FIG. 3, when a gap between the first corner portion C1 and the second corner portion C2 of each of the upper and lower surfaces 2 and 3 in the direction of the insert center line O is indicated by h and a gap between the first corner portions C1 of the upper and lower surfaces 2 and 3 in the direction of the insert center line O is indicated by H, for example, a ratio h/H therebetween is set to be larger than 0.21.

Figure 11:
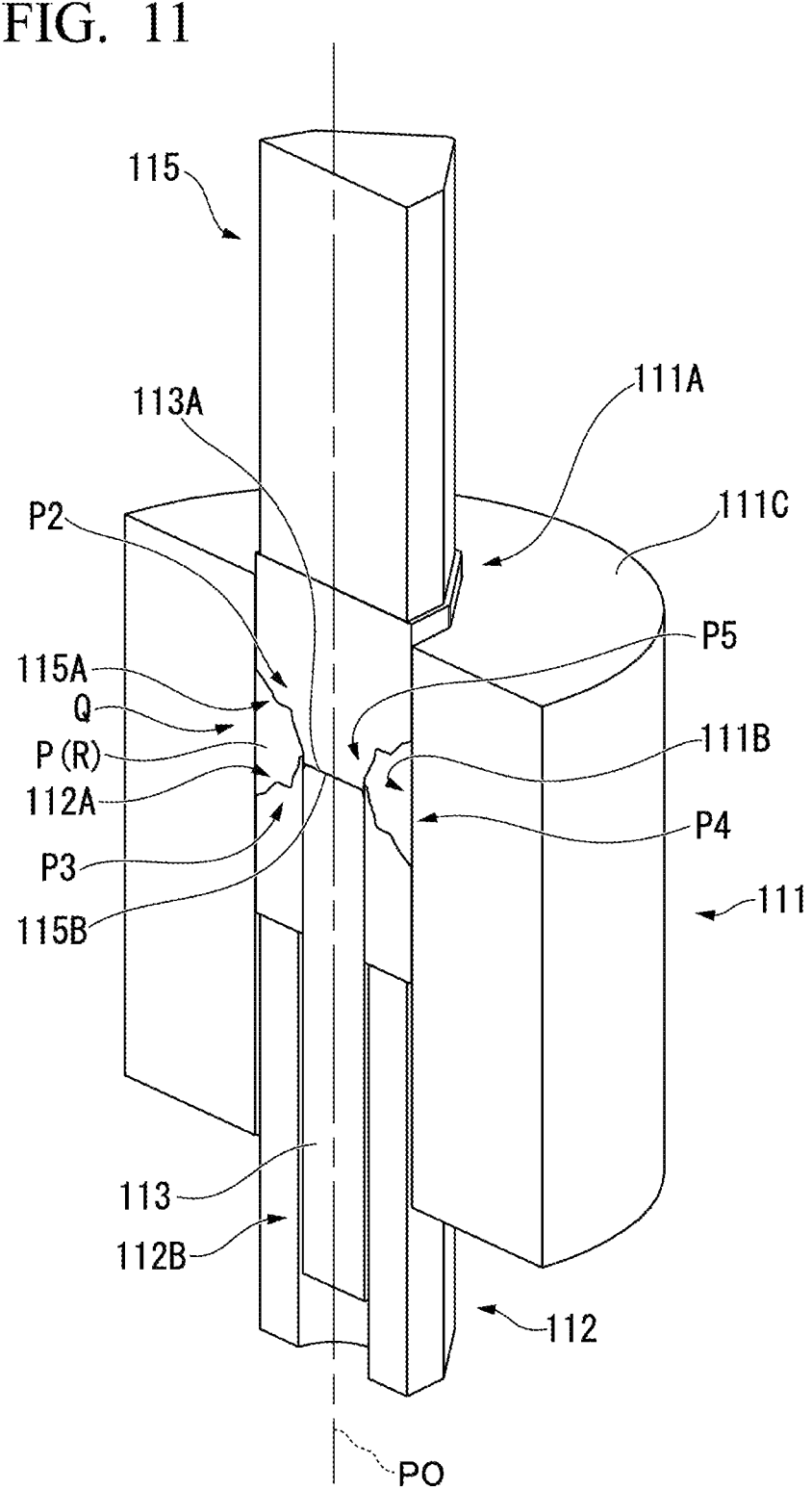
FIG. 11 is a sectional view when the die and the lower punch in the state shown in FIG. 10 are taken along the insert center line.
Figure 12:
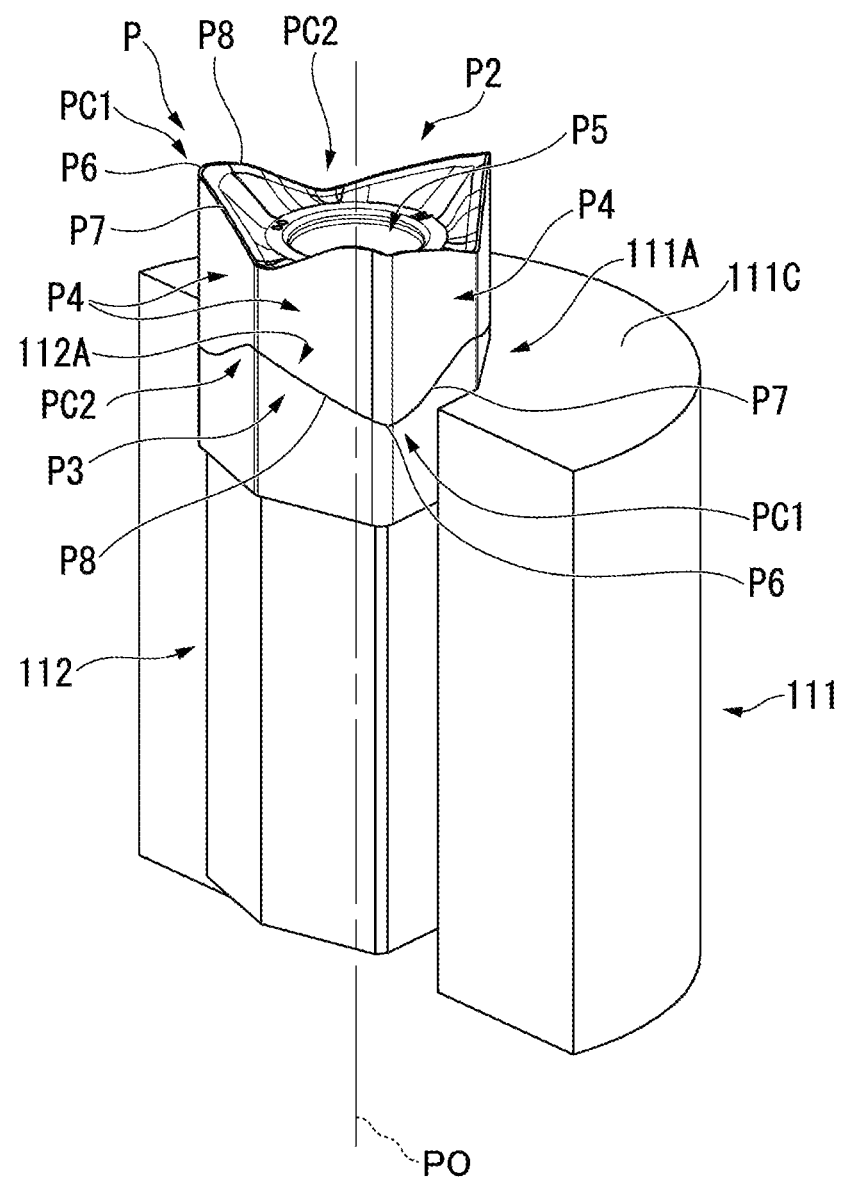
FIG. 12 is a view showing a state where the green compact for a cutting insert, which is powder-molding-pressed from the state shown in FIG. 10, is extracted from the die.
Figure 13:
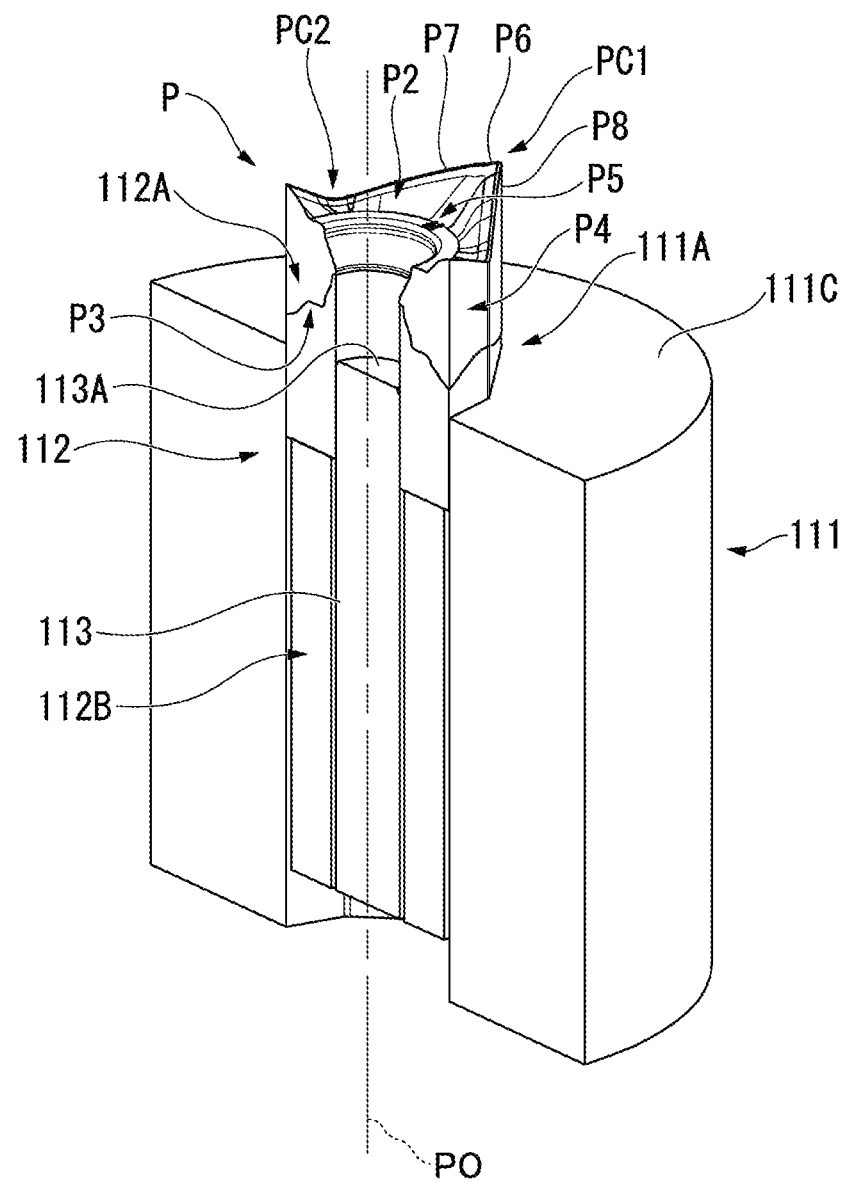
FIG. 13 is a sectional view when the die and the lower punch in the state shown in FIG. 12 are taken along the insert center line.

As shown in FIGS. 12 and 13, a green compact P for a cutting insert manufactured to be sintered to the cutting insert is substantially similar to the insert body 1, has dimensions larger than those of the insert body 1, and is sintered to be shrunk to the dimensions of the insert body 1. Here, in FIGS. 6 to 13, a reference numeral P is added to the beginnings of the same reference numerals as those of FIGS. 1 and 3 with respect to portions corresponding to the sintered cutting insert in the green compact P for a cutting insert, and the same names are used to describe the portions corresponding to the cutting insert.

Figure 4:
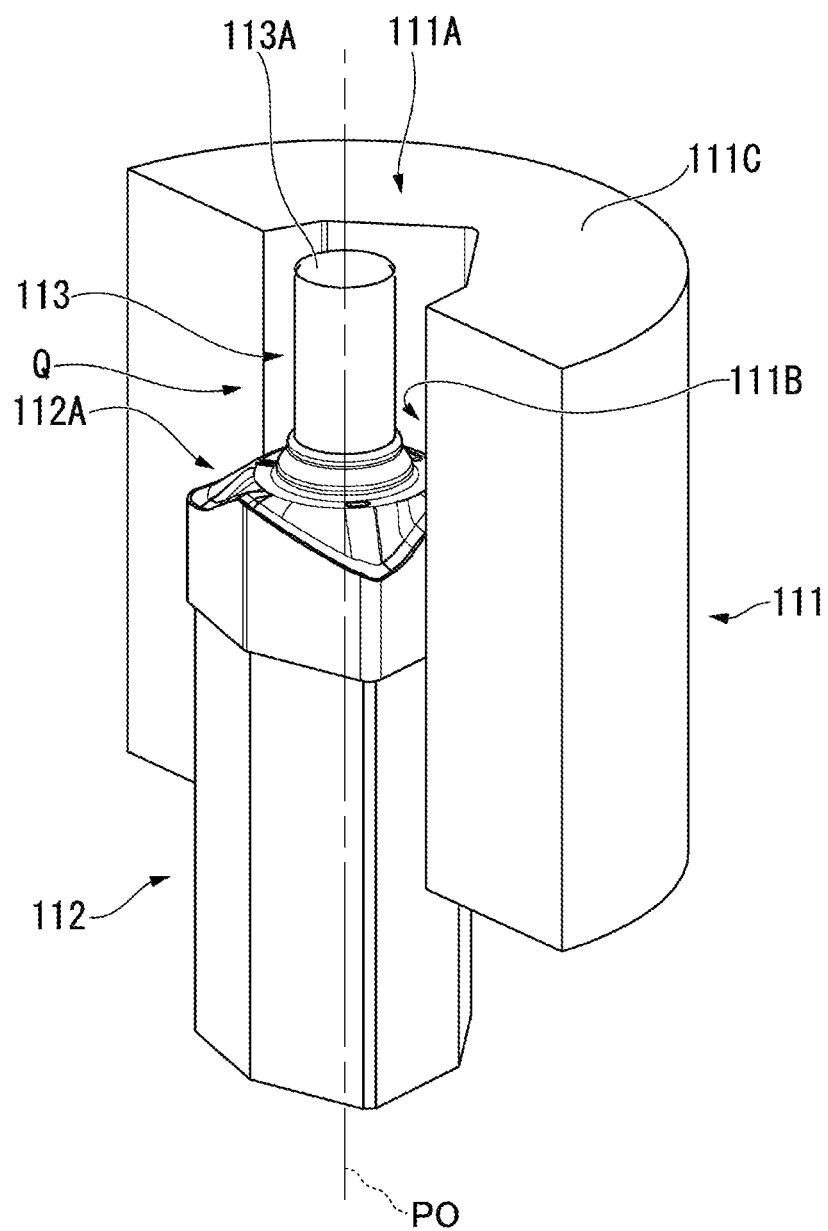
FIG. 4 is a sectional view when a die showing a first embodiment of a powder molding press device of the green compact for a cutting insert of the present invention is taken along an insert center line and is a view showing a lower punch.
Figure 5:
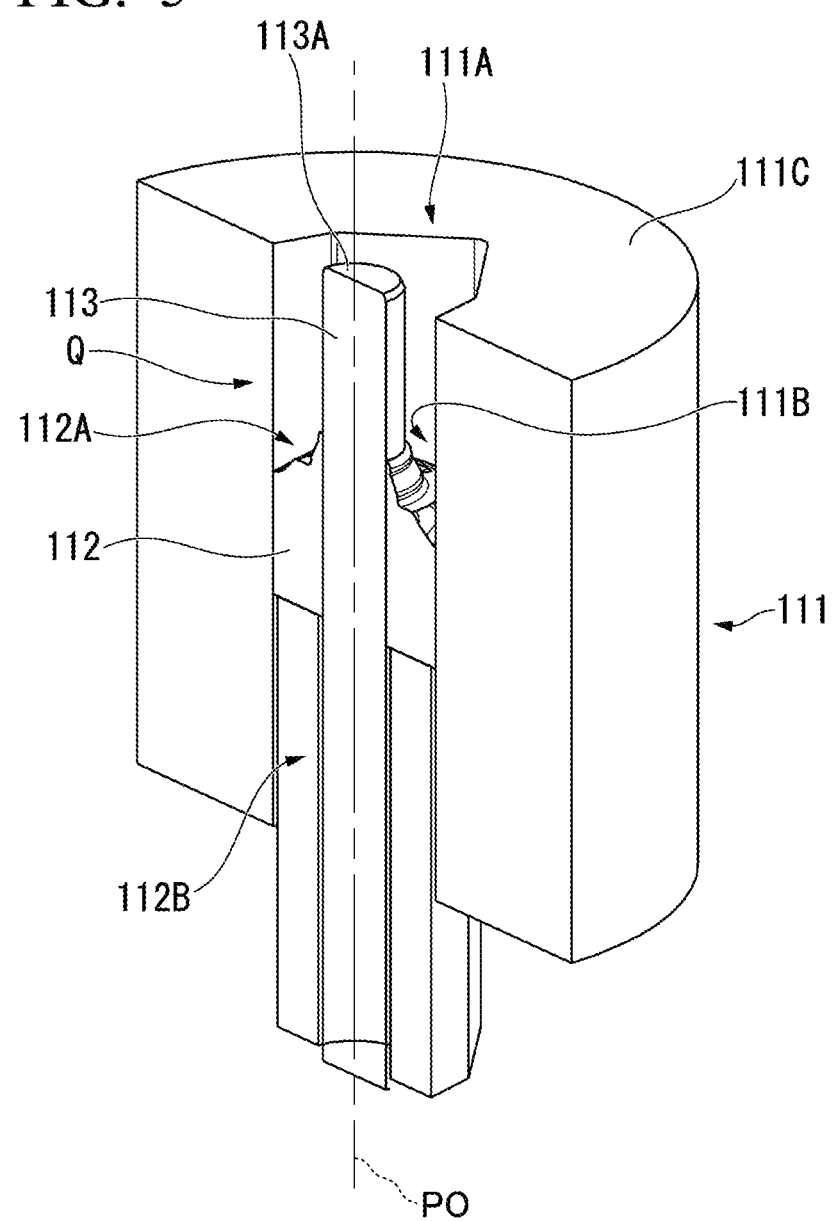
FIG. 5 is a sectional view when the die and the lower punch of the embodiment shown in FIG. 4 are taken along the insert center line.
Figure 6:
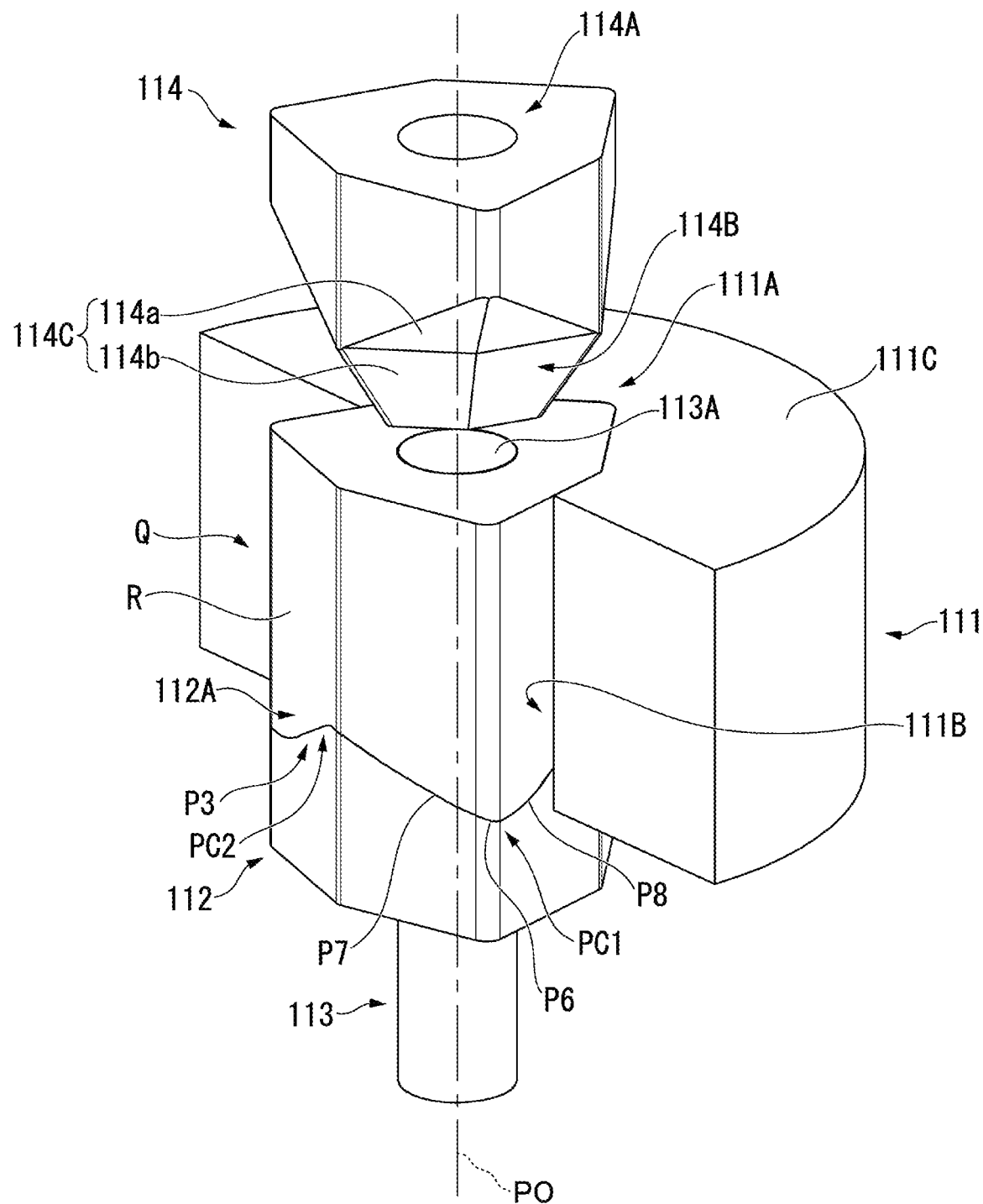
FIG. 6 is a view showing a state (state before the step of performing the preliminary molding) where a molding space formed by a lower surface molding surface of the lower punch and a side surface molding surface of the die is filled with a raw material powder and an upper punch for preliminary molding, in the embodiment shown in FIG. 4.
Figure 7:
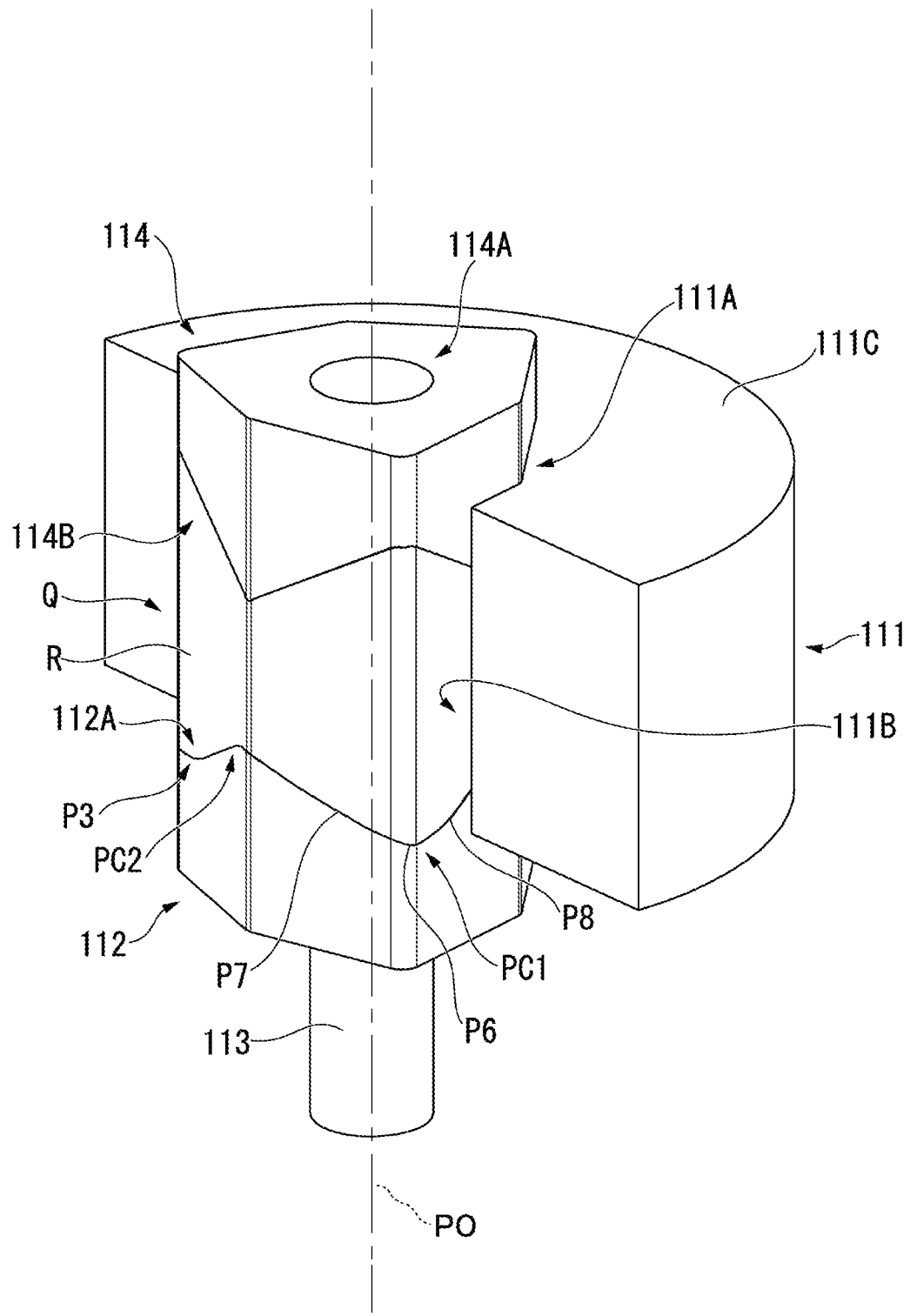
FIG. 7 is a view showing a state where the upper punch for preliminary molding is inserted into the molding space from the state shown in FIG. 6.
Figure 8:
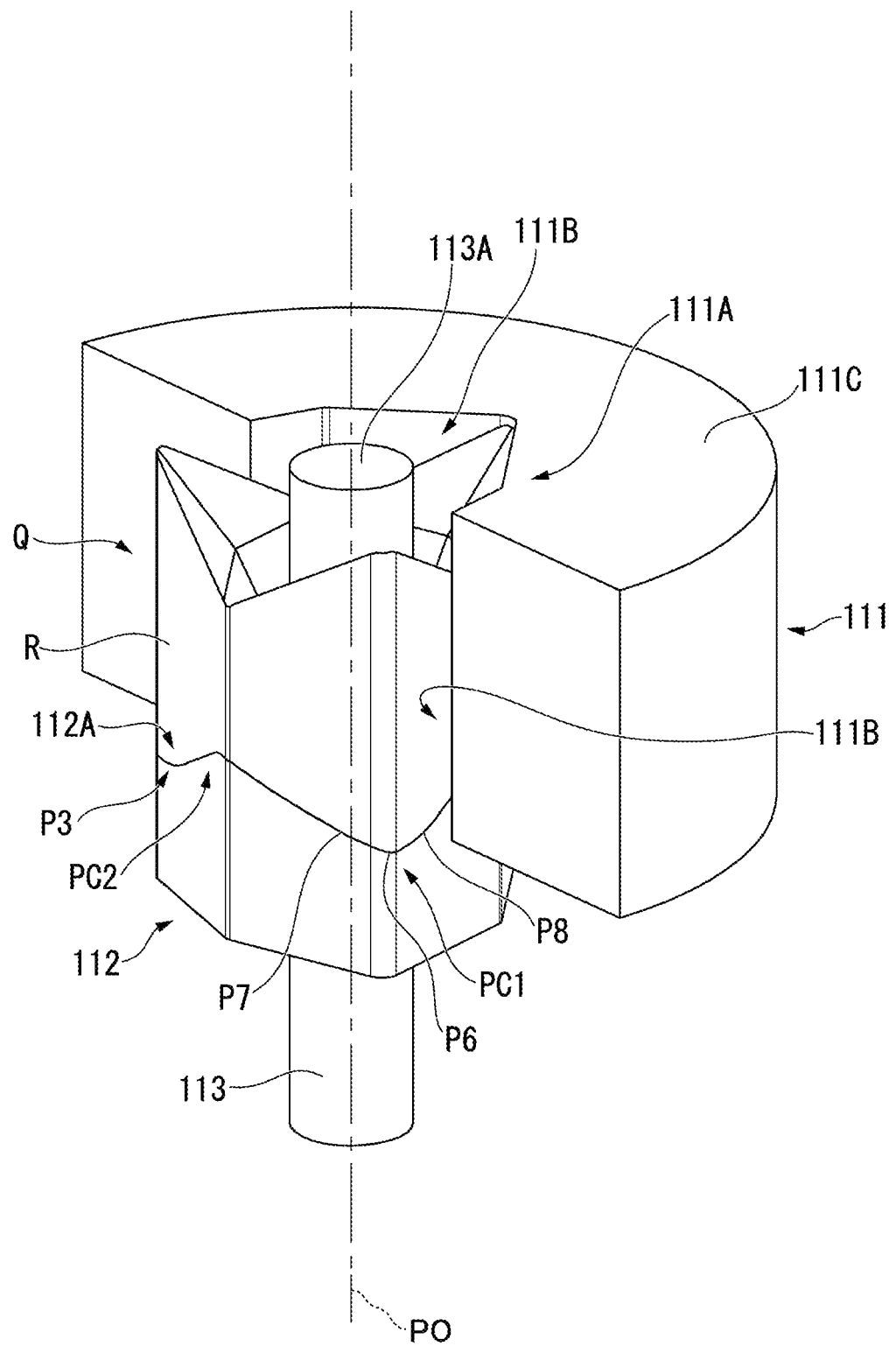
FIG. 8 is a view showing a state where the upper punch for preliminary molding is pulled out from the molding space from the state shown in FIG. 7.
Figure 9:
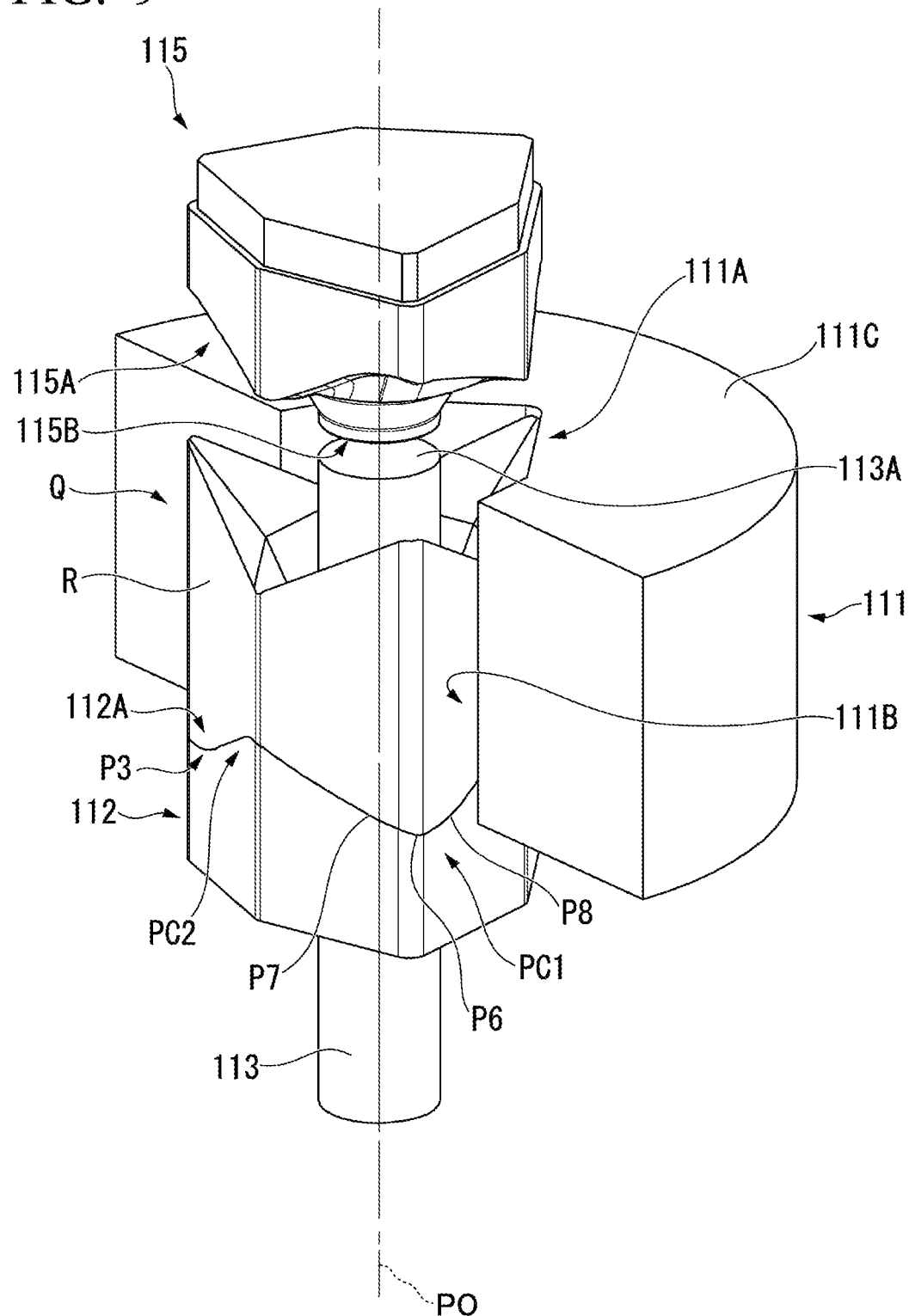
FIG. 9 is a view showing a state where an upper punch for final molding is disposed above the molding space from the state shown in FIG. 8.
Figure 10:
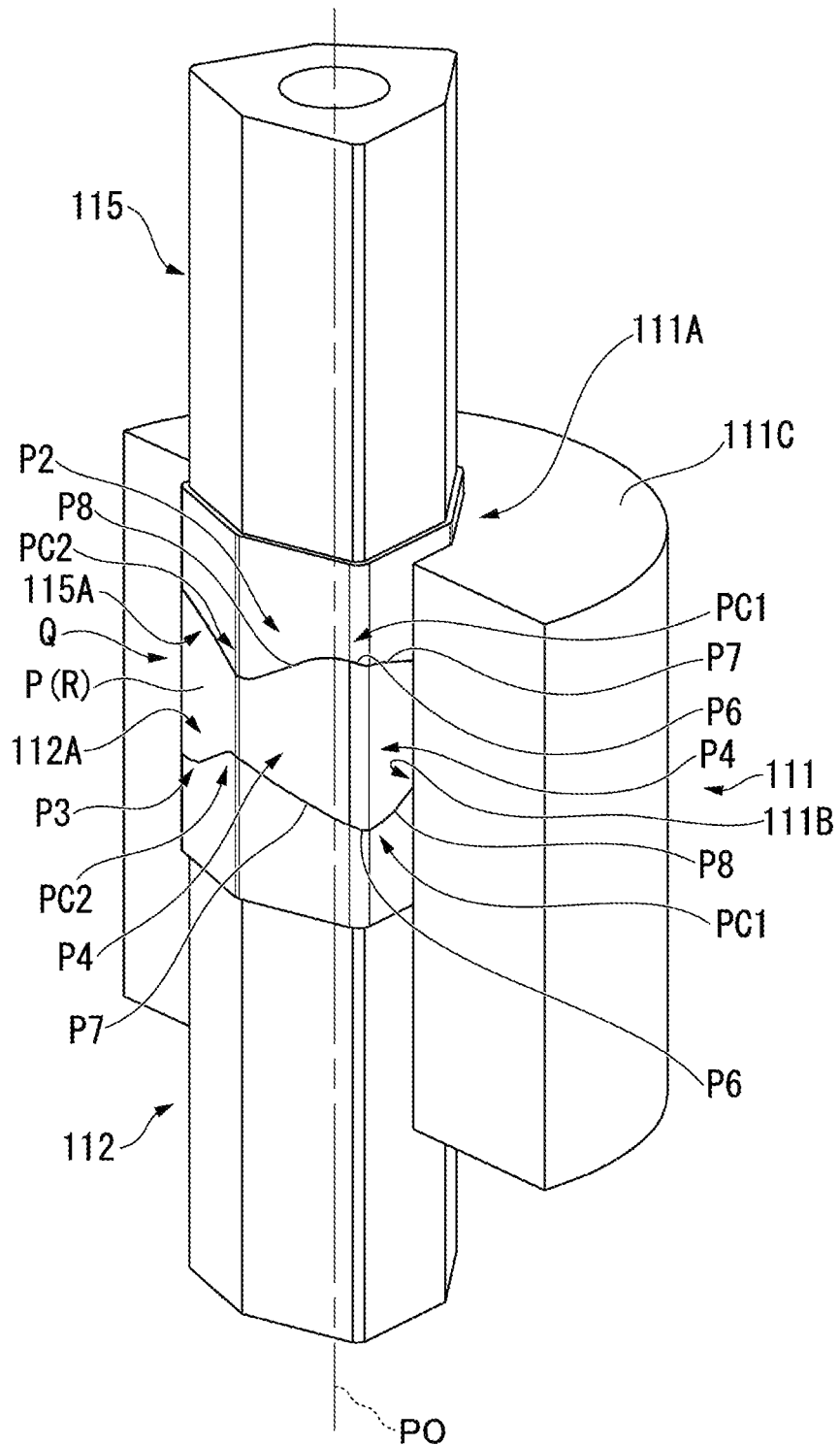
FIG. 10 is a view showing a state where the upper punch for final molding is inserted into the molding space from the state shown in FIG. 9.

The powder molding press device of the present embodiment which powder-molding presses the green compact P for a cutting insert includes a die 111, a lower punch 112, and a pin 113 shown in FIGS. 4 to 13, an upper punch 114 for preliminary molding shown in FIGS. 6 and 7, and an upper punch 115 for final molding shown in FIGS. 9 to 11. In addition, in FIGS. 6 to 9, lower portions of the die 111 and lower punch 112 and upper portions of the upper punch 114 for preliminary molding and the upper punch 115 for final molding are not shown.

In the die 11l, a hole portion 111A is formed to penetrate the green compact P for a cutting insert up and down, the hole portion 111A has an uneven hexagonal cross section having the same dimensions and shape as those of a cross section of the green compact P for a cutting insert perpendicular to an insert center line PO of the green compact P for a cutting insert, and thus, a center line of the hole portion 111A is coaxial with the insert center line PO. Inner peripheral surfaces of the hole portion 111A are parallel to the insert center line PO and become side surface molding surfaces 111B which mold side surfaces P4 of the green compact P for a cutting insert. In addition, an upper surface 111C of the die 111 has a planar shape perpendicular to the insert center line PO.

The lower punch 112 is formed to have dimensions and a shape so that an upper end portion thereof can be fitted into the hole portion 111A and is movable up or down at a predetermined stroke in a direction of the insert center line PO, and the upper end portion of the lower punch 112 is fitted into the hole portion 111A from below and is inserted into the hole portion 111A. In addition, the die 111 may move up or down in a state where the lower punch 112 is fixed such that the lower punch 112 is relatively inserted into the hole portion 111A from below, or both the die 111 and the lower punch 112 may be movable up or down. An upper end surface of the lower punch 112 has, except for a center portion of the upper end surface, a shape obtained by inverting unevenness of a shape of a lower surface P3 of the green compact P for a cutting insert and a shape up to ½ depth of a fitting hole P5 on the lower surface P3 side in the direction of the insert center line PO, in plane symmetry with respect to a plane perpendicular to the insert center line PO, and the upper end surface is provided with a lower surface molding surface 112A molding the lower surface P3 of the green compact P for a cutting insert.

In addition, in the lower punch 112, a through hole 112B which penetrates the lower punch 112 up and down along the insert center line PO and has a circular cross section having a constant inner diameter centered on the insert center line PO is formed and is open to a center portion of the lower surface molding surface 112A, the columnar pin 113 formed to have a circular cross section having a constant outer diameter is fitted into the through hole 112B from below and is inserted into the through hole 112B, and the lower punch 112 is movable up or down at a predetermined stroke in the direction of the insert center line PO. An upper end surface 113A of the pin 113 has a planar shape perpendicular to the insert center line PO.

Next, the upper punch 115 for final molding is described. A lower end portion of the upper punch 115 for final molding is formed to have dimensions and a shape which can be fitted into the hole portion 111A, the upper punch 115 for final molding is movable up or down at a predetermined stroke in the direction of the insert center line PO, and the lower end portion is fitted into the hole portion 111A from above and inserted into the hole portion 111A. A lower end surface of the upper punch 115 for final molding has a shape obtained by inverting unevenness of a shape of an upper surface P2 of the green compact P for a cutting insert and a shape up to ½ depth of the fitting hole P5 on the upper surface P2 side in the direction of the insert center line PO, in plane symmetry with respect to a plane perpendicular to the insert center line PO, and the lower end surface is provided with an upper surface molding surface 115A molding the upper surface P2 of the green compact P for a cutting insert.

Accordingly, in the upper surface molding surface 115A, a center portion of the upper surface P2 which molds a periphery of the opening portion of the fitting hole P5 most recessed in the direction of the insert center line PO protrudes downward most, and in the green compact P for a cutting insert, a portion of a first corner portion PC1 of the upper surface P2 protruding most in the direction of the insert center line PO is most recessed upward. Moreover, in a center portion of the upper surface molding surface 115A protruding most downward, a circular surface 115B which can abut on the upper end surface 113A of the pin 113 is formed to be perpendicular to the insert center line PO. In addition, the upper surface molding surface 115A is inclined to gradually protrude downward from an outer peripheral edge of the upper surface molding surface 115A of the upper punch 115 for final molding, which molds a corner edge P6, a primary cutting edge P7, and the secondary cutting edge P8 in the green compact P for a cutting insert, toward the circular surface 115B.

In addition, a lower end portion of the upper punch 114 for preliminary molding is formed to have dimensions and a shape which can be fitted into the hole portion 111A and is movable up or down at a predetermined stroke in the direction of the insert center line PO. Moreover, in the upper punch 114 for preliminary molding, an accommodation hole 114A having a circular cross section centered on the insert center line PO is formed along the insert center line PO, and an inner diameter of the accommodation hole 114A is set such that the upper end portion of the pin 113 is fitted into the accommodation hole 114A and can be accommodated therein.

Moreover, the lower end surface of the upper punch 114 for preliminary molding is provided with a preliminary molding surface 114B, the preliminary molding surface 114B has a shape different from the shape obtained by inverting the upper surface P2 of the green compact P for a cutting insert in plane symmetry, and is also different from the upper surface molding surface 115A of the upper punch 115 for final molding. In the present embodiment, the preliminary molding surface 114B is formed such that a protrusion amount downward from the outer peripheral edge of the preliminary molding surface 114B in a thin portion between the upper and lower surfaces P2 and P3 in the green compact P for a cutting insert in the direction of the insert center line PO is larger than that of the shape obtained by inverting the upper surface P2 of the green compact P for a cutting insert in plane symmetry, that is, the shape of the upper surface molding surface 115A of the upper punch 115 for final molding.

Here, in the present embodiment, a gap H between the first corner portions PC1 of the upper and lower surfaces P2 and P3 in the green compact P for a cutting insert is largest, and a thickness in the direction of the insert center line PO is thickest in this portion. Moreover, the periphery of the opening portion of the fitting hole P5 of the upper and lower surfaces P2 and P3 is most recessed in the direction of the insert center line PO, and the thickness in the direction of the insert center line PO is thinnest in this portion. Accordingly, in the present embodiment, the preliminary molding surface 114B of the upper punch 114 for preliminary molding is formed such that a protrusion amount of the upper surface P2 of the green compact P for a cutting insert from the portion molding the first corner portion PC1 to the portion molding the periphery of the opening portion of the fitting hole P5 of the center portion is larger than a protrusion amount of the upper punch 115 for final molding from the portion molding the first corner portion PC1 to the portion molding the periphery of the opening portion of the fitting hole P5.

In addition, when the preliminary molding surface 114B of the present embodiment is viewed as a receding amount in the direction of the insert center line PO from the portion most protruding downward, the preliminary molding surface 114B is formed such that the receding amount increases as the thickness of the green compact P for a cutting insert in the direction of the insert center line PO increases. That is, in the present embodiment, in the green compact P for a cutting insert, the thickness of the portion between the first corner portions PC1 of the upper and lower surfaces P2 and P3 in the direction of the insert center line PO is larger than the thickness of the portion between the second corner portions PC2. Accordingly, the preliminary molding surface 114B is formed such that a receding amount of a portion corresponding to the first corner portion PC1 of the upper surface P2 from a lower end of the preliminary molding surface 114B is larger than a receding amount of a portion corresponding to the second corner portion PC2.

Moreover, in the preliminary molding surface 114B of the upper punch 114 for preliminary molding, except for the periphery of the accommodation hole 114A, an inclined surface 114C is formed, which protrudes downward toward the thin portion between the upper and lower surfaces P2 and P3 in the green compact P for a cutting insert in the direction of the insert center line PO. That is, in the present embodiment, an inclined surface 114C is formed, which gradually protrudes downward toward the center portion of the preliminary molding surface 114B molding the periphery of the opening portion of the fitting hole P5 having a thin thickness. In addition, in the present embodiment, the inclined surface 114C is formed by a plurality of steps (two steps in the present embodiment) of planar inclined surface portions 114*a* and 114*b* whose inclined angles with respect to the insert center line PO decrease toward the thin portion.

In an embodiment of the powder molding press method of the green compact P for a cutting insert of the present invention using the above-described powder molding press device, first, as shown in FIGS. 4 and 5, the lower punch 112 is lowered such that the lower surface molding surface 112A is located at a predetermined depth from the upper surface 111C of the die 111, the pin 113 protrudes from the lower punch 112 such that the upper end surface 113A is located at the same position as that of the upper surface 111C of the die 111 in the direction of the insert center line PO, and thus, a molding space Q of the green compact P for a cutting insert is formed by the side surface molding surfaces 111B of the die 111, the lower surface molding surface 112A of the lower punch 112, and the outer peripheral surface of the pin 113.

Next, the molding space Q is filled with a hard raw material powder R such as cemented carbide, cermet, or ceramics forming the insert body 1. Here, the filling of the raw material powder R is performed by horizontally moving a feeder (not shown) forward such that the feeder slides on the upper surface 111C of the die 111 to locate the feeder at the opening portion of the hole portion 111A of the upper surface 111C, supplying the raw material powder R having a larger volume than an internal volume of the molding space Q from the feeder to the hole portion 111A, and thereafter, horizontally moving the feeder backward such that the feeder slides on the upper surface 111C of the die 111.

In addition, when the feeder moves backward, the raw material powder R having a larger volume than the internal volume of the molding space Q is supplied, raised from the upper surface 111C of the die 111, and struck by the feeder. Accordingly, as shown in FIG. 6, an upper surface of the filled raw material powder R is flush with the upper surface 111C of the die 111 and the upper end surface 113A of the pin 113. That is, in the present embodiment, the feeder (supply means) for supplying the raw material powder R of the powder molding press device includes scrapping means for scrapping the raw material powder R along the upper surface 111C of the die 111. Accordingly, the molding space Q is filled with a certain amount of raw material powder R. In the way, a state where the upper surface of the raw material powder R is struck and the molding space Q is filled with a certain amount of raw material powder R is a state before the step of performing the preliminary molding in the present embodiment.

In this way, if the molding space Q is filled with the raw material powder R, as shown in FIG. 6, the upper punch 114 for preliminary molding is located above the molding space Q, the lower end portion is fitted into the hole portion 111A of the die 111 from above and is inserted into the hole portion 111A, and as shown in FIGS. 7 and 8, the raw material powder R is performed the preliminary molding. In addition, before the upper punch 114 for preliminary molding is inserted, if the lower punch 112 is lowered such that the upper surface of the raw material powder R moves backward so as to be located at a position lower than that of the upper surface 111C of the die 111, it is possible to prevent the raw material powder R from overflowing when the upper punch 114 for preliminary molding is inserted into the opening portion of the hole portion 111A in the upper surface 111C.

According to the preliminary molding performed by the upper punch 114 for preliminary molding, the raw material powder R moves from the thin portion between the upper and lower surfaces P2 and P3 in the green compact P for a cutting insert in the direction of the insert center line PO toward the thick portion in the direction of the insert center line PO. Therefore, relative to the state before the step of performing the preliminary molding, the thick portion in the direction of the insert center line PO is filled with more raw material powder R than the thin portion in the direction of the insert center line PO in the green compact P for a cutting insert.

That is, in the present embodiment, as shown in FIG. 8, the raw material powder R moves from the periphery of the opening portion of the fitting hole P5 in the upper surface P2 of the green compact P for a cutting insert to the side surface molding surface 111B side of the die 111 on the outer peripheral side. In addition, relative to the state before the step of performing the preliminary molding, more raw material powder R moves to the thick portion between the first corner portions PC1 of the upper and lower surfaces P2 and P3 in the green compact P for the cutting insert in the direction of the insert center line PO than moves the portion between the second corner portions PC2.

Next, in this way, if the raw material powder R is performed the preliminary molding, the upper punch 114 for preliminary molding is raised so as to be pulled out from the hole portion 111A, and is removed from a portion above the molding space Q. Thereafter, as shown in FIG. 9, the upper punch 115 for final molding is located above the molding space Q, and the lower end portion of the upper punch 115 for final molding is inserted into the hole portion 111A so as to be fitted into the hole portion 111A and is lowered. In addition, as shown in FIGS. 10 and 11, the raw material powder R is compressed and powder-molding-pressed between the lower surface molding surface 112A of the lower punch 112 and the upper surface molding surface 115A of the upper punch 115 for final molding, and thus, the green compact P for a cutting insert is finally molded. In addition, the circular surface 115B abuts on the upper end surface 113A of the pin 113 while the upper punch 115 for final molding is lowered, and thereafter, as shown in FIG. 11, the pin 113 is lowered together with the upper punch 115 for final molding, and thus, the powder molding press is performed.

Moreover, in this way, if the green compact P for a cutting insert is finally molded, the upper punch 115 for final molding is raised to be pulled out from the hole portion 111A of the die 111, and next, as shown in FIGS. 12 and 13, the lower punch 112 is raised such that the lower surface molding surface 112A protrudes from the upper surface 111C of the die 111, and thereafter, the finally molded green compact P for a cutting insert is taken out. In this way, the finally molded green compact P for a cutting insert is sintered, and thus, the cutting insert shown in FIGS. 1 to 3 is manufactured.

In this way, according to the powder molding press method and the powder molding press device of the green compact P for a cutting insert configured as described above, before the raw material powder R is powder-molding-pressed between the lower surface molding surface 112A of the lower punch 112 and the upper surface molding surface 115A of the upper punch 115 for final molding to finally mold the green compact P for a cutting insert, the raw material powder R is performed the preliminary molding by the upper punch 114 for preliminary molding having the preliminary molding surface 114B having the shape different from the shape obtained by inverting the upper surface P2 of the finally molded green compact P for a cutting insert in plane symmetry. Accordingly, the raw material powder R can move such that the thick portion between the upper and lower surfaces P2 and P3 in the green compact P for a cutting insert in the direction of the insert center line PO is filled with more raw material powder R than the thin portion therebetween, relative to the state before the step of performing the preliminary molding.

Therefore, when the raw material powder R performed the preliminary molding in this way is finally molded to the green compact P for a cutting insert having a predetermined dimension and shape by the upper punch 115 for final molding, a portion between the upper surface molding surface 115A and the lower surface molding surface 112A is filled with the raw material powder R having a filling amount corresponding to a thickness between the upper and lower surfaces P2 and P3 in the direction of the insert center line PO in the green compact P for a cutting insert, and thus, a density of the raw material powder R in the finally molded green compact P for a cutting insert can be made uniform. Accordingly, when the green compact P for a cutting insert finally molded in this way is sintered, it is possible to limit the occurrence of strain or deformation. Therefore, even when the upper and lower surfaces 2 and 3 of the insert body 1 are largely uneven and the thicknesses between the upper and lower surfaces 2 and 3 are partially different from each other, it is possible to manufacture the cutting insert having high precision.

Moreover, in the present embodiment, in this way, in order to perform the preliminary molding such that the thick portion between the upper and lower surfaces P2 and P3 in the green compact P for a cutting insert in the direction of the insert center line PO is filled with more raw material powder R than the thin portion therebetween, relative to the state before the step of performing the preliminary molding, the preliminary molding surface 114B of the upper punch 114 for preliminary molding is formed to have a downward protrusion amount larger than that of the upper surface molding surface 115A of the upper punch 115 for final molding which molds the upper surface P2 in the thin portion between the upper and lower surfaces P2 and P3 in the green compact P for a cutting insert in the direction of the insert center line PO.

Accordingly, in this way, the raw material powder R is extruded from the thin portion in the green compact P for a cutting insert in the direction of the insert center line PO to the thick portion by the preliminary molding surface 114B having a large downward protrusion amount so as to be largely moved, and thereafter, the raw material powder R is powder-molding-pressed by the upper surface molding surface 115A of the upper punch 115 for final molding, the density of the raw material powder R can be more uniformly adjusted, and it is possible to manufacture a more reliable and precise cutting insert.

Moreover, in the present embodiment, the preliminary molding surface 114B of the upper punch 114 for preliminary molding is provided with the inclined surface 114C which protrudes downward toward the thin portion between the upper and lower surfaces P2 and P3 in the green compact P for a cutting insert in the direction of the insert center line PO. Accordingly, the raw material powder R can be smoothly guided to the thick portion between the upper and lower surfaces P2 and P3 in the direction of the insert center line PO by the inclined surface 114C, it is possible to reliably mold the green compact P for a cutting insert having a uniform density even when a powder molding press time per one green compact P for a cutting insert is short, and it is possible to improve manufacturing efficiency.

Moreover, in the present embodiment, the inclined surface 114C is formed by the plurality of steps of planar inclined surface portions 114a and 114b having a small inclined angle with respect to the insert center line PO toward the thin portion between the upper and lower surfaces P2 and P3 of the green compact P for a cutting insert. Therefore, the raw material powder R can be more smoothly extruded from the inclined surface portion 114a having a small inclined angle to the inclined surface portion 114b having a large inclined angle, and it is possible to mold the green compact P for a cutting insert having a uniform density even during a shorter powder molding press time.

Moreover, in the present embodiment, each of the inclined surface portions 114a and 114b has a planar shape. However, for example, a cross section of the inclined surface 114C along the insert center line PO may be formed to have a recessed curve shape or a convex curve shape such that the raw material powder R is guided from the thin portion between the upper and lower surfaces P2 and P3 of the green compact P for a cutting insert in the direction of the insert center line PO to the thick portion. In addition, the inclined surface 114C having the recessed curve shaped or convex curve shaped cross section and the planar inclined surface portions 114a and 114b may be combined with each other to guide the raw material powder R.

Moreover, in the present embodiment, as shown in FIGS. 1 to 3, the case is described in which the green compact P for a cutting insert manufactured to the negative type cutting insert including the insert body 1 having the uneven hexagonal plate shape is powder-molding-pressed. However, a shape of the insert body 1 or the green compact P for a cutting insert is not limited, and the present invention can be applied to a case where the green compact P for a cutting insert manufactured to a positive type cutting insert is powder-molding-pressed. In addition, the preliminary molding may be performed multiple times, and the refilling of the raw material powder R may be performed during the multiple preliminary molding.

Second Embodiment

As described in the first embodiment, FIGS. 1 to 3 show the cutting insert manufactured by sintering the green compact for a cutting insert which is powder-molding-pressed by the first and second embodiments of the powder molding press method and the powder molding press device of the green compact for a cutting insert of the present invention. FIGS. 14 to 23 show a powder molding press device of a green compact for a cutting insert of the second embodiment. The powder molding press method of the present embodiment is also described using FIGS. 14 to 23.

Characteristics of the cutting insert manufactured by sintering the green compact for a cutting insert which is powder-molding-pressed by the powder molding press method and the powder molding press device of the green compact for a cutting insert of the second embodiment of the present invention are similar to those of the first embodiment, and thus, a detailed description thereof is omitted.

Figure 21:
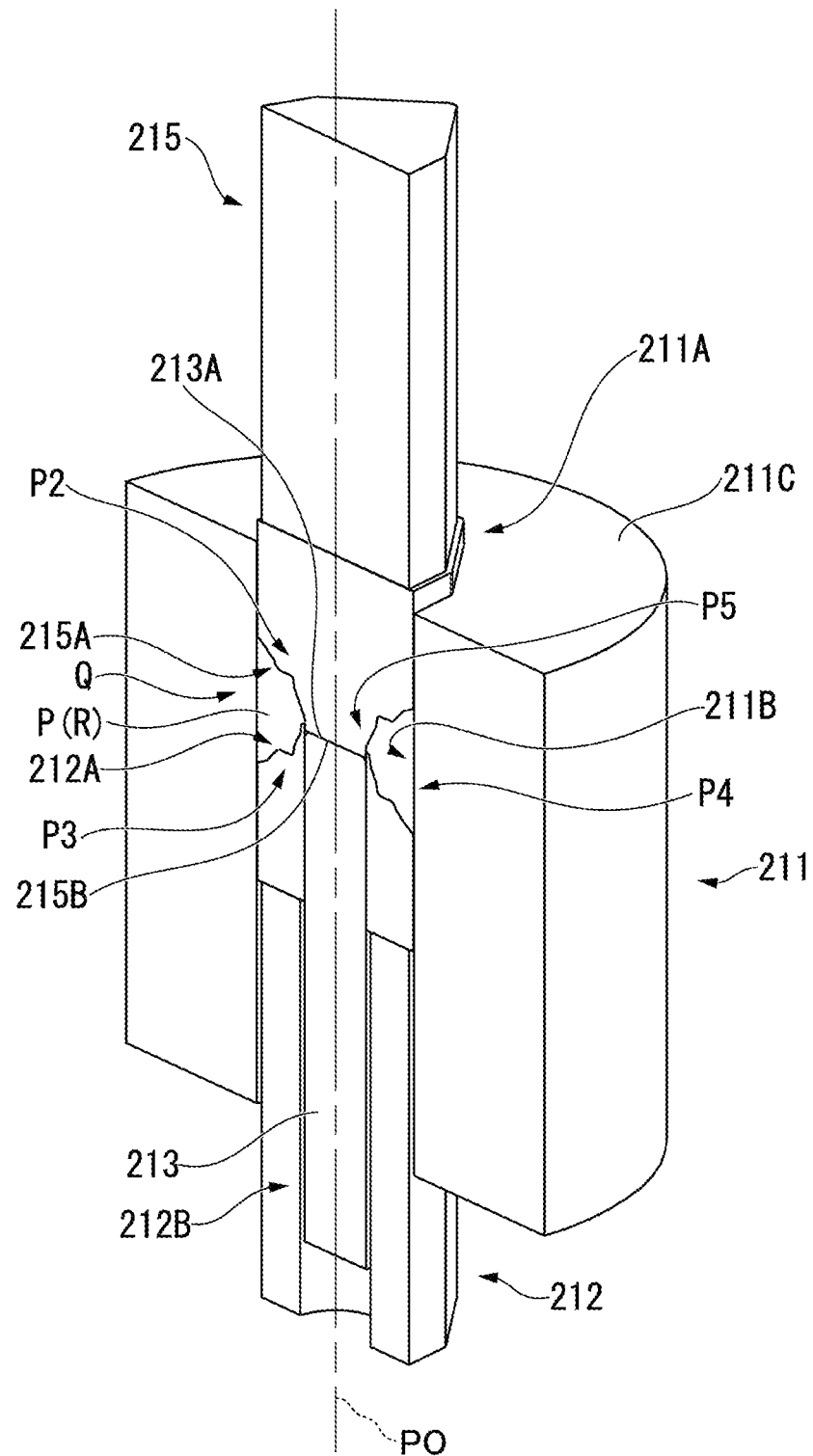
FIG. 21 is a sectional view when the die and the lower punch in the state shown in FIG. 20 are taken along the insert center line.
Figure 22:
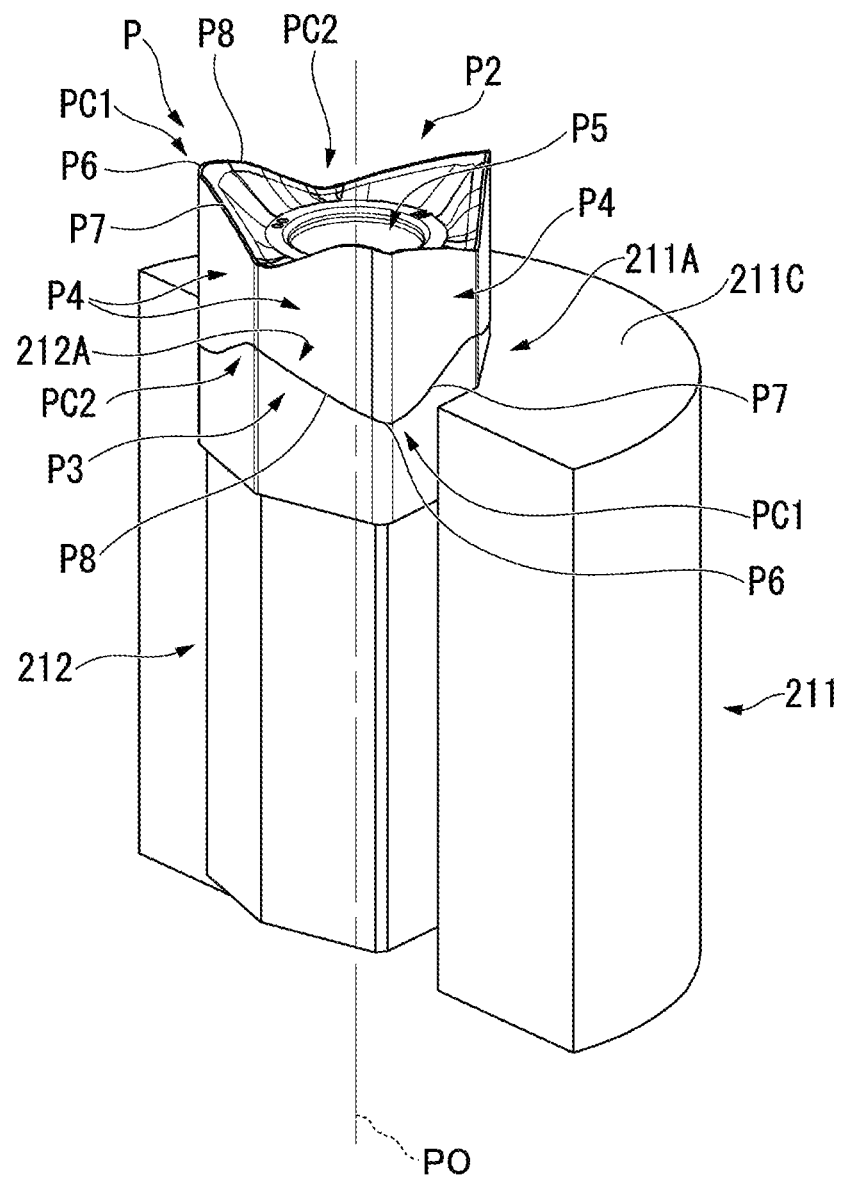
FIG. 22 is a view showing a state where the green compact for a cutting insert, which is powder-molding-pressed from the state shown in FIG. 20, is extracted from the die.
Figure 23:
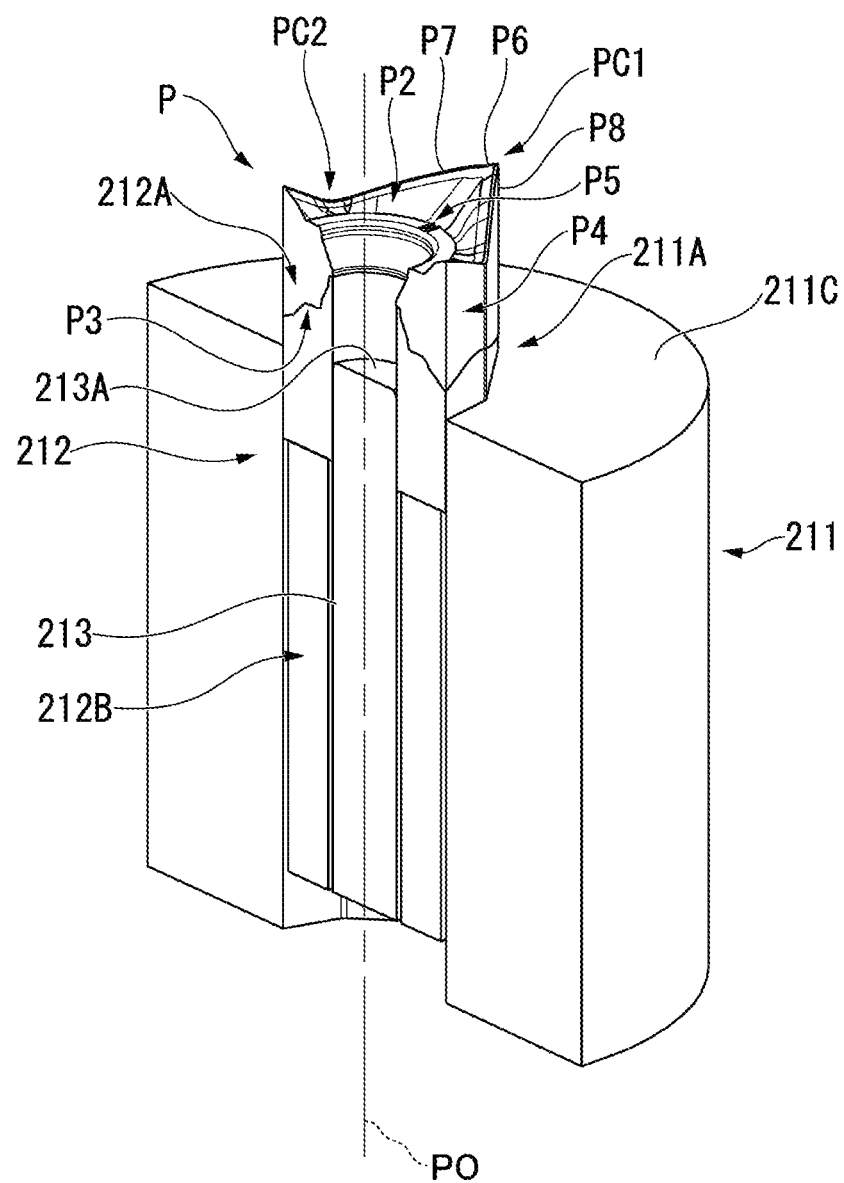
FIG. 23 is a sectional view when the die and the lower punch in the state shown in FIG. 22 are taken along the insert center line.

As shown in FIGS. 22 and 23, the green compact P for a cutting insert manufactured to be sintered to the cutting insert is substantially similar to the insert body 1, has dimensions larger than those of the insert body 1, and is sintered to be shrunk to the dimensions of the insert body 1. Here, in FIGS. 16 to 23, a reference numeral P is added to beginnings of the same reference numerals as those of FIGS. 1 and 3 with respect to portions corresponding to the sintered cutting insert in the green compact P for a cutting insert, and the same names are used to describe the portions corresponding to the cutting insert.

Figure 14:
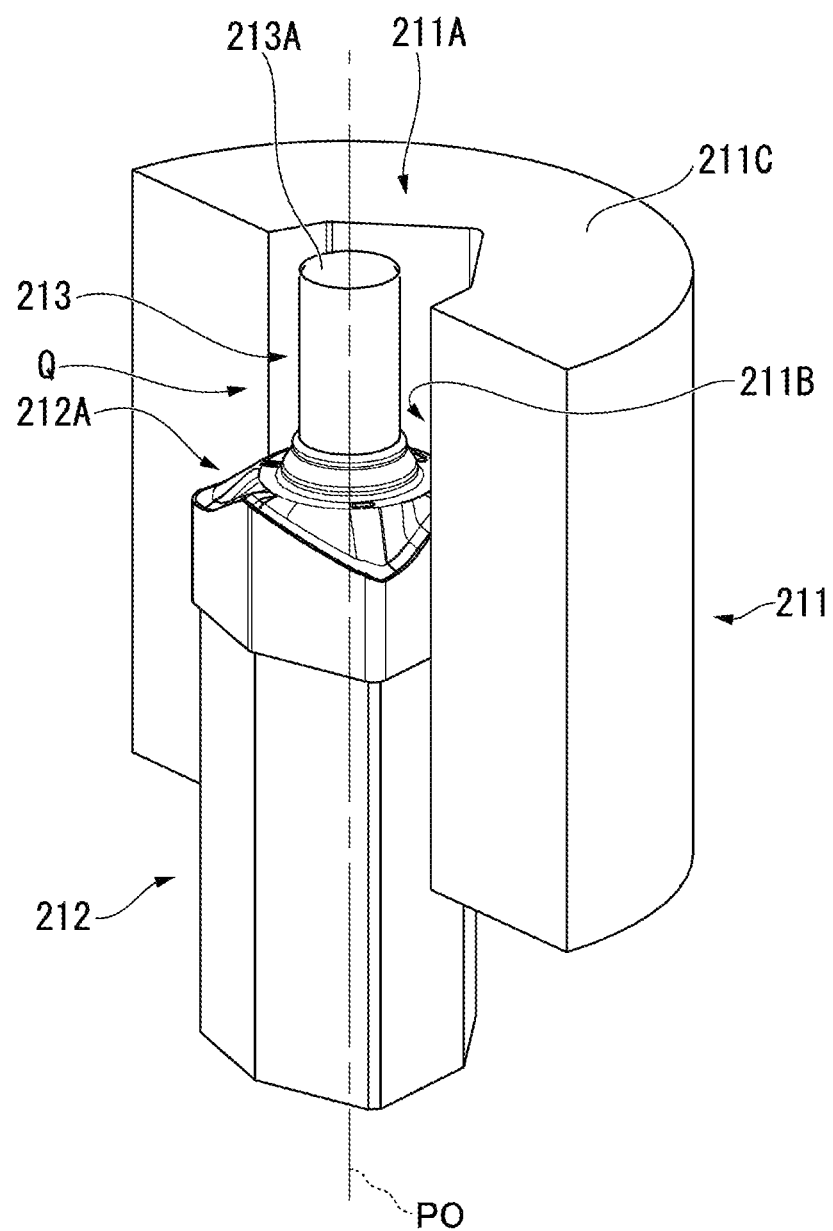
FIG. 14 is a sectional view when a die showing a second embodiment of a powder molding press device of the green compact for a cutting insert of the present invention is taken along an insert center line and is a view showing a lower punch.
Figure 15:
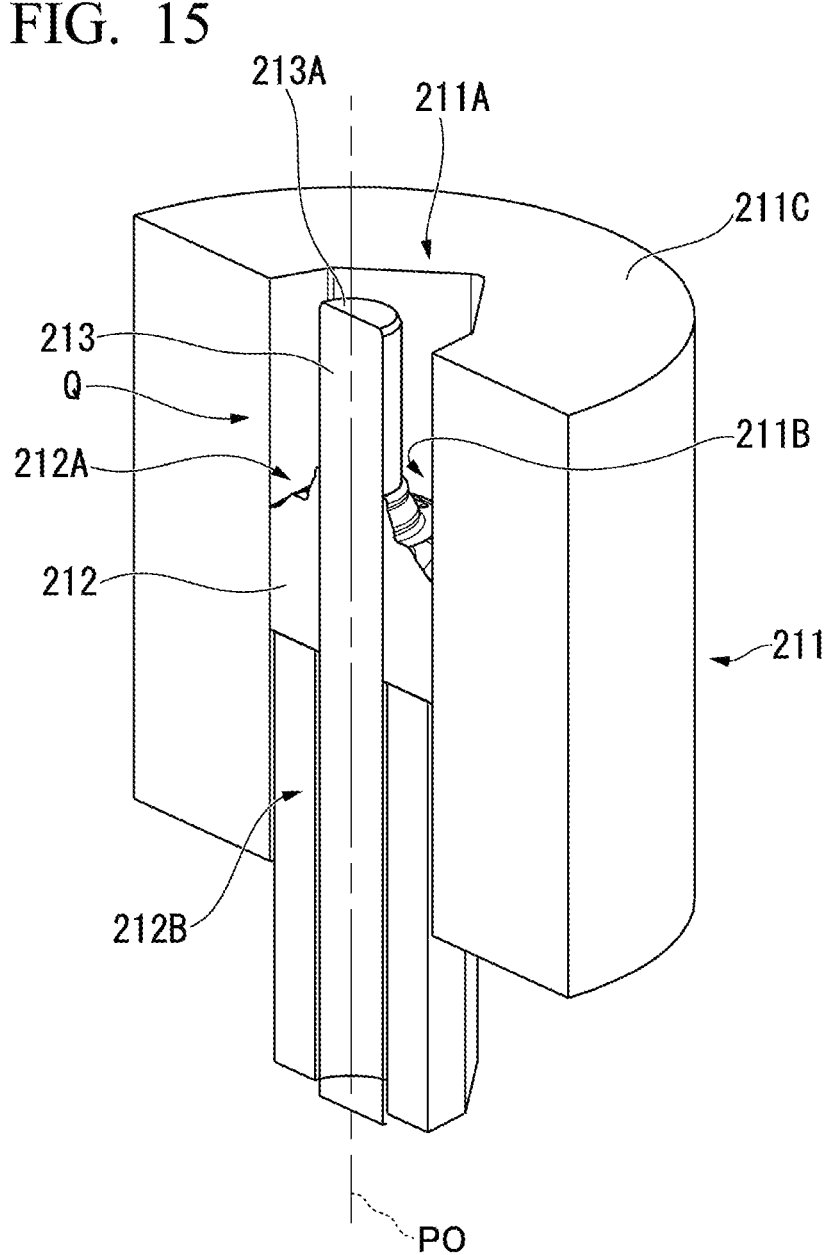
FIG. 15 is a sectional view when the die and the lower punch of the embodiment shown in FIG. 14 are taken along the insert center line.
Figure 16:
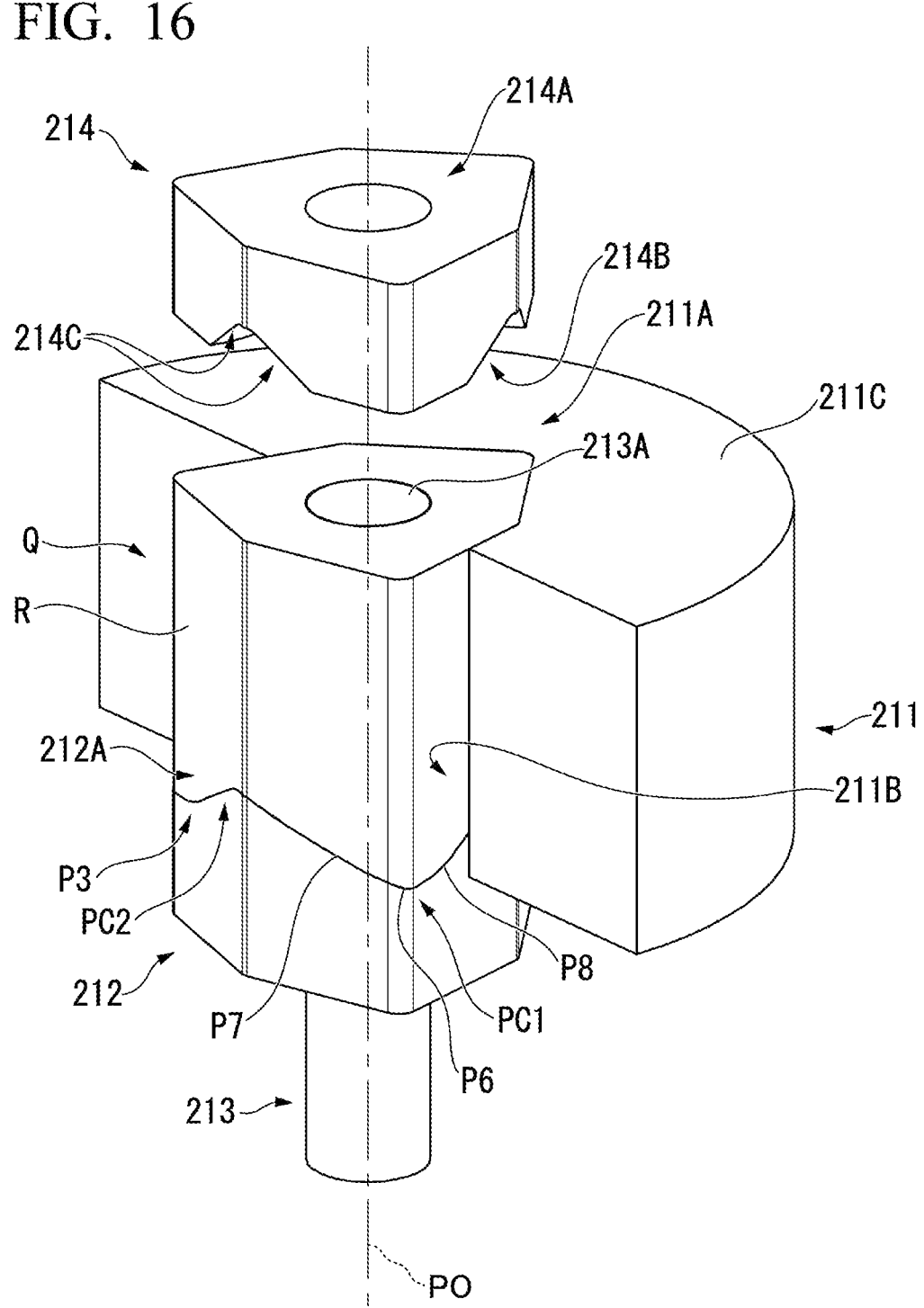
FIG. 16 is a view showing a state (state before the step of performing the preliminary molding) where a molding space formed by a lower surface molding surface of the lower punch and a side surface molding surface of the die is filled with a raw material powder and an upper punch for preliminary molding, in the embodiment shown in FIG. 14.
Figure 17:
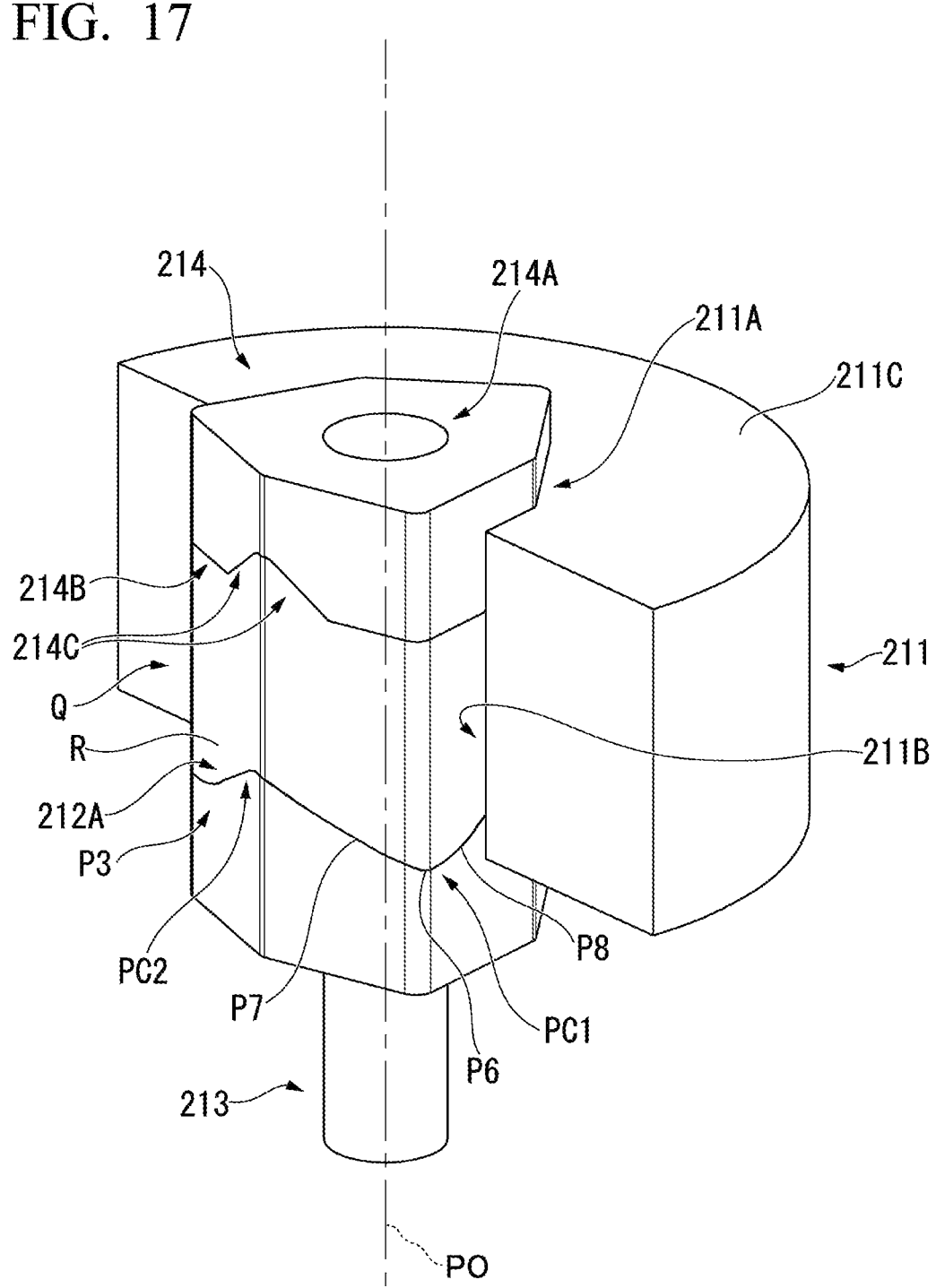
FIG. 17 is a view showing a state where the upper punch for preliminary molding is inserted into the molding space from the state shown in FIG. 16.
Figure 18:
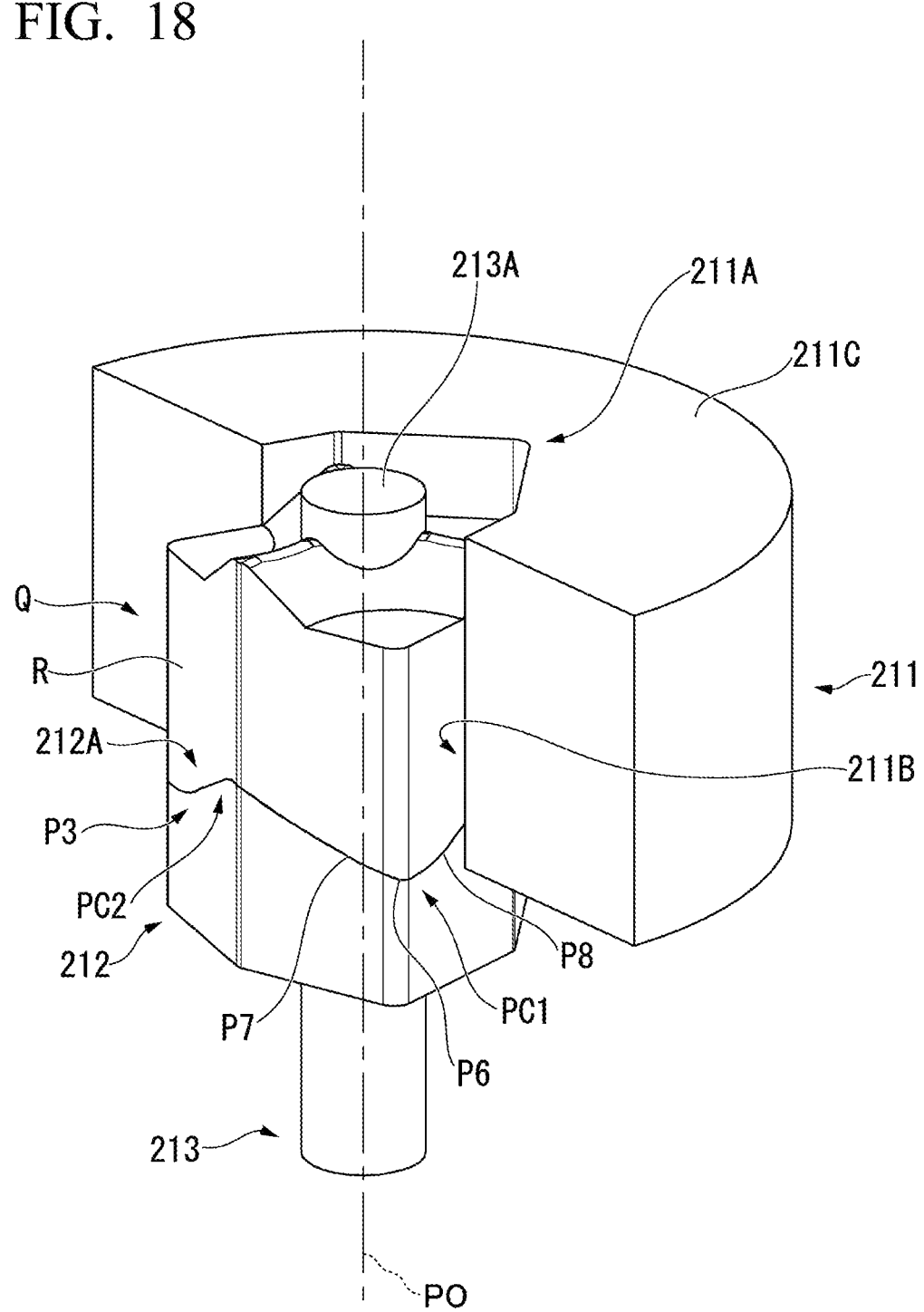
FIG. 18 is a view showing a state where the upper punch for preliminary molding is pulled out from the molding space from the state shown in FIG. 17.
Figure 19:
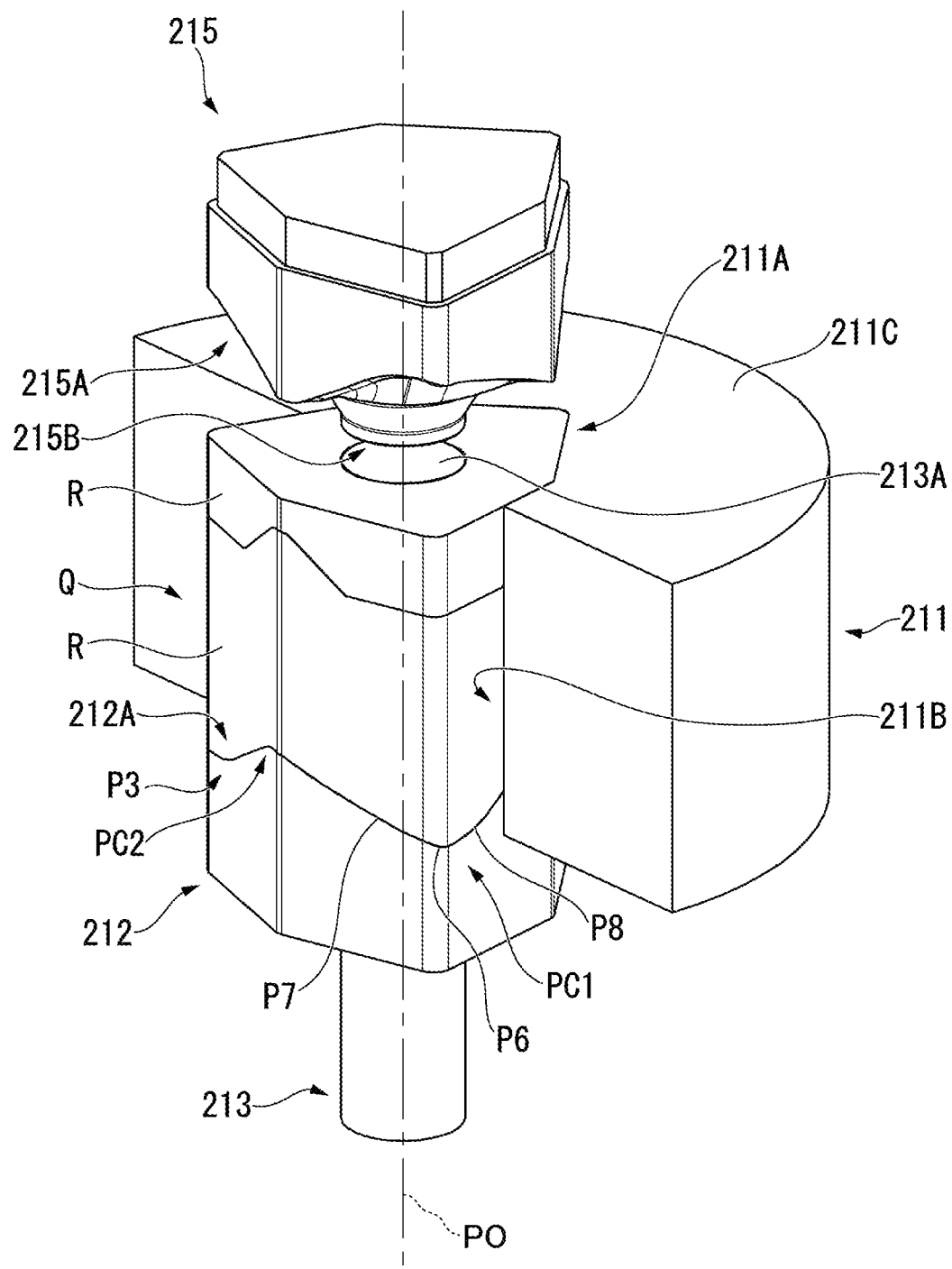
FIG. 19 is a view showing a state where an upper punch for final molding is disposed above the molding space after refilling of the raw material powder is performed from the state shown in FIG. 18.
Figure 20:
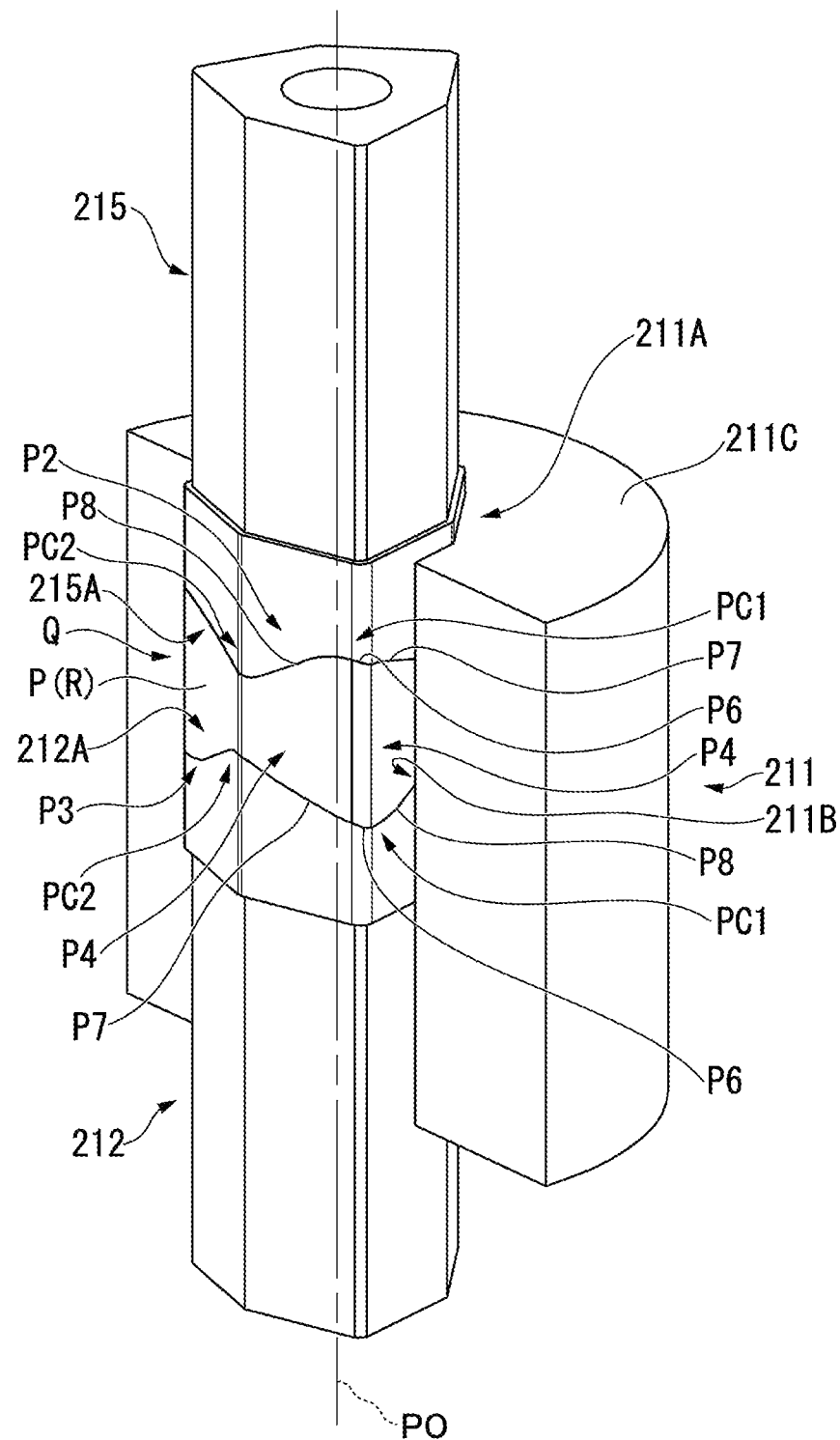
FIG. 20 is a view showing a state where the upper punch for final molding is inserted into the molding space from the state shown in FIG. 19.

The powder molding press device of the present embodiment which powder-molding presses the green compact P for a cutting insert includes a die 211, a lower punch 212, and a pin 213 shown in FIGS. 14 to 23, an upper punch 214 for preliminary molding shown in FIGS. 16 and 17, and an upper punch 215 for final molding shown in FIGS. 19 to 21. In addition, in FIGS. 16 to 19, lower portions of the die 211 and lower punch 212 and upper portions of the upper punch 214 for preliminary molding and the upper punch 215 for final molding are not shown.

In the die 211, a hole portion 211A is formed to penetrate the die 211 up and down, the hole portion 211A has an uneven hexagonal cross section having the same dimensions and shape as those of a cross section of the green compact P for a cutting insert perpendicular to the insert center line PO, and thus, a center line of the hole portion 211A is coaxial with the insert center line PO. Inner peripheral surfaces of the hole portion 211A are parallel to the insert center line PO and become side surface molding surfaces 211B which mold the side surfaces P4 of the green compact P for a cutting insert. In addition, an upper surface 211C of the die 211 has a planar shape perpendicular to the insert center line PO.

The lower punch 212 is formed to have dimensions and a shape so that an upper end portion thereof can be fitted into the hole portion 211A and is movable up or down at a predetermined stroke in the direction of the insert center line PO, and the upper end portion of the lower punch 212 is fitted into the hole portion 211A from below and is inserted into the hole portion 211A. In addition, the die 211 may move up or down in a state where the lower punch 212 is fixed such that the lower punch 212 is relatively inserted into the hole portion 211A from below, or both the die 211 and the lower punch 212 may be movable up or down. An upper end surface of the lower punch 212 has, except for a center portion of the upper end surface, a shape obtained by inverting unevenness of the shape of the lower surface P3 of the green compact P for a cutting insert and the shape up to ½ depth of a fitting hole P5 on the lower surface P3 side in the direction of the insert center line PO, in plane symmetry with respect to a plane perpendicular to the insert center line PO, and the upper end surface is provided with a lower surface molding surface 212A molding the lower surface P3 of the green compact P for a cutting insert.

In addition, in the lower punch 212, a through hole 212B which penetrates the lower punch 212 up and down along the insert center line PO and has a circular cross section having a constant inner diameter centered on the insert center line PO is formed and is open to a center portion of the lower surface molding surface 212A, the columnar pin 213 formed to have a circular cross section having a constant outer diameter is fitted into the through hole 212B from below and is inserted into the through hole 212B, and the lower punch 212 is movable up or down at a predetermined stroke in the direction of the insert center line PO. An upper end surface 213A of the pin 213 has a planar shape perpendicular to the insert center line PO.

Next, the upper punch 215 for final molding is described. A lower end portion of the upper punch 215 for final molding is formed to have dimensions and a shape which can be fitted into the hole portion 211A, the upper punch 215 for final molding is movable up or down at a predetermined stroke in the direction of the insert center line PO, and the lower end portion is fitted into the hole portion 211A from above and inserted into the hole portion 211A. A lower end surface of the upper punch 215 for final molding has the shape obtained by inverting unevenness of the shape of the upper surface P2 of the green compact P for a cutting insert and the shape up to ½ depth of the fitting hole P5 on the upper surface P2 side in the direction of the insert center line PO, in plane symmetry with respect to a plane perpendicular to the insert center line PO, and the lower end surface is provided with an upper surface molding surface 215A molding the upper surface P2 of the green compact P for a cutting insert.

Accordingly, in the upper surface molding surface 215A, the center portion of the upper surface P2 which molds the periphery of the opening portion of the fitting hole P5 most recessed in the direction of the insert center line PO protrudes downward most, and in the green compact P for a cutting insert, the portion of the first corner portion PC1 of the upper surface P2 protruding most in the direction of the insert center line PO is most recessed upward. Moreover, in a center portion of the upper surface molding surface 215A protruding most downward, a circular surface 215B which can abut on the upper end surface 213A of the pin 213 is formed to be perpendicular to the insert center line PO. In addition, the upper surface molding surface 215A is inclined to gradually protrude downward from the outer peripheral edge of the upper surface molding surface 215A of the upper punch 215 for final molding, which molds the corner edge P6, the primary cutting edge P7, and the secondary cutting edge P8 in the green compact P for a cutting insert, toward the circular surface 215B.

In addition, a lower end portion of the upper punch 214 for preliminary molding is formed to have dimensions and a shape which can be fitted into the hole portion 211A and is movable up or down at a predetermined stroke in the direction of the insert center line PO. Moreover, in the upper punch 214 for preliminary molding, an accommodation hole 214A having a circular cross section centered on the insert center line PO is formed along the insert center line PO, and an inner diameter of the accommodation hole 214A is set such that the upper end portion of the pin 213 is fitted into the accommodation hole 214A and can be accommodated therein.

Moreover, the lower end surface of the upper punch 214 for preliminary molding is provided with a preliminary molding surface 214B, the preliminary molding surface 214B has a shape different from the shape obtained by inverting the upper surface P2 of the green compact P for a cutting insert in plane symmetry, and is also different from the upper surface molding surface 215A of the upper punch 215 for final molding. In the present embodiment, the preliminary molding surface 214B is formed such that a direction of an unevenness of the preliminary molding surface 214B is opposite to that of the shape obtained by inverting the upper surface P2 of the green compact P for a cutting insert in plane symmetry, that is, the shape of the upper surface molding surface 215A of the upper punch 215 for final molding.

Here, in the present embodiment, the gap H between the first corner portions PC1 of the upper and lower surfaces P2 and P3 in the green compact P for a cutting insert is largest, and the thickness in the direction of the insert center line PO is thickest in this portion. Moreover, the periphery of the opening portion of the fitting hole P5 of the upper and lower surfaces P2 and P3 is most recessed in the direction of the insert center line PO, and the thickness in the direction of the insert center line PO is thinnest in this portion. Accordingly, in the present embodiment, the preliminary molding surface 214B of the upper punch 214 for preliminary molding is formed such that a portion performing the preliminary molding to the portion of the upper surface P2 of the green compact P for the cutting insert corresponding to the first corner portion PC1 further protrudes than a center portion of the preliminary molding surface 214B performing the preliminary molding to the portion corresponding to the periphery of the opening portion of the fitting hole P5 of the center portion of the upper surface P2.

Moreover, the preliminary molding surface 214B may have a shape obtained by inverting the upper surface molding surface 215A of the upper punch 215 for final molding in plane symmetry with respect to the plane perpendicular to the insert center line PO such that the direction of the unevenness of the preliminary molding surface 214B is opposite to that of the upper surface molding surface 215A. However, in the present embodiment, the portion performing the preliminary molding to the portion corresponding to the periphery of the first corner portion PC1 of the upper surface P2 is a fan-shaped plane substantially perpendicular to the insert center line PO or centered on the first corner portion PC1 gently facing downward toward the first corner portion PC1 side, and further protrudes downward than a portion which connects the portion performing the preliminary molding to the portion corresponding to the second corner portion PC2 and the center portion of the preliminary molding surface 214B to each other.

In addition, in the preliminary molding surface 214B, a conical inclined surface 214C is formed from the portion which connects the portion performing the preliminary molding to the portion corresponding to the second corner portion PC2 of the upper surface P2 and the center portion of the preliminary molding surface 214B to each other, that is, the thin portion between the upper and lower surfaces P2 and P3 in the green compact P for a cutting insert in the direction of the insert center line PO to the fan-shaped planar portion performing the preliminary molding to the portion corresponding to the periphery of the first corner portion PC1 of the upper surface P2, that is, the thick portion between the upper and lower surfaces P2 and P3 in the green compact P for a cutting insert in the direction of the insert center line PO, and the inclined surface 214C protrudes downward toward the thick portion.

In an embodiment of the powder molding press method of the green compact P for a cutting insert of the present invention using the above-described powder molding press device, first, as shown in FIGS. 14 and 15, the lower punch 212 is lowered such that the lower surface molding surface 212A is located at a predetermined depth from the upper surface 211C of the die 211, the pin 213 protrudes from the lower punch 212 such that the upper end surface 213A is located at the same position as that of the upper surface 211C of the die 211 in the direction of the insert center line PO, and thus, the molding space Q of the green compact P for a cutting insert is formed by the side surface molding surfaces 211B of the die 211, the lower surface molding surface 212A of the lower punch 212, and the outer peripheral surface of the pin 213.

Next, the molding space Q is filled with a hard raw material powder R such as cemented carbide, cermet, or ceramics forming the insert body 1. Here, the filling of the raw material powder R is performed by horizontally moving the feeder (not shown) forward such that the feeder slides on the upper surface 211C of the die 211 to locate the feeder at the opening portion of the hole portion 211A of the upper surface 211C, supplying the raw material powder R having a larger volume than the internal volume of the molding space Q from the feeder to the hole portion 211A, and thereafter, horizontally moving the feeder backward such that the feeder slides on the upper surface 211C of the die 211.

In addition, when the feeder moves backward, the raw material powder R having a larger volume than the internal volume of the molding space Q is supplied, raised from the upper surface 211C of the die 211, and struck by the feeder. Accordingly, as shown in FIG. 16, an upper surface of the filled raw material powder R is flush with the upper surface 211C of the die 211 and the upper end surface 213A of the pin 213. That is, in the present embodiment, the feeder (supply means) for supplying the raw material powder R of the powder molding press device includes scrapping means for scrapping the raw material powder R along the upper surface 211C of the die 211. Accordingly, the molding space Q is filled with a certain amount of raw material powder R. In the way, a state where the upper surface of the raw material powder R is struck and the molding space Q is filled with a certain amount of raw material powder R is a state before the step of performing the preliminary molding in the present embodiment.

In this way, if the molding space Q is filled with the raw material powder R, as shown in FIG. 16, the upper punch 214 for preliminary molding is located above the molding space Q, the lower end portion is fitted into the hole portion 211A of the die 211 from above and is inserted into the hole portion 211A, and as shown in FIGS. 17 and 18, the raw material powder R is performed the preliminary molding by the preliminary molding surface 214B. In addition, before the upper punch 214 for preliminary molding is inserted, if the lower punch 212 is lowered such that the upper surface of the raw material powder R moves backward so as to be located at a position lower than that of the upper surface 211C of the die 211, it is possible to prevent the raw material powder R from overflowing when the upper punch 214 for preliminary molding is inserted into the opening portion of the hole portion 211A in the upper surface 211C.

Therefore, according to the preliminary molding performed by the upper punch 214 for preliminary molding, as shown in FIG. 18, the raw material powder R filling the molding space Q is compressed such that the portion having the thick thickness between the upper and lower surfaces P2 and P3 in the green compact P for a cutting insert in the direction of the insert center line PO is more deeply pushed in than the thin portion in the direction of the insert center line PO, and thus, in a depth of the upper surface of the raw material powder R, the thick portion between the upper and lower surfaces P2 and P3 in the direction of the insert center line PO becomes deeper.

Accordingly, if the raw material powder R is performed the preliminary molding in this way, the upper punch 214 for preliminary molding is raised so as to be pulled out from the hole portion 211A and is removed from the portion above the molding space Q. Subsequently, refilling the same kind of raw material powder R as the initially filled raw material powder R is performed, or in some cases, refilling of a kind of raw material powder R different from the initially filled raw material powder R is performed. A method of the refilling is the same as the method of the initial filling, and the upper surface of the refilled raw material powder R is struck to be flush with the upper surface 211C of the die 211. Accordingly, as shown in FIG. 19, the thick portion between the upper and lower surfaces P2 and P3 in the direction of the insert center line PO in the green compact P for a cutting insert in which the upper surface of the raw material powder R initially filled to be performed the preliminary molding becomes deep is refilled with more raw material powder R relative to the state before the step of performing the preliminary molding.

In this way, if the refilling of the raw material powder R is performed, as shown in FIG. 19, the upper punch 215 for final molding is located above the molding space Q, and the lower end portion of the upper punch 215 for final molding is inserted into the hole portion 211A so as to be fitted into the hole portion 211A and is lowered. In addition, as shown in FIGS. 20 and 21, the initially filled raw material powder R and the refilled raw material powder R are compressed and powder-molding-pressed between the lower surface molding surface 212A of the lower punch 212 and the upper surface molding surface 215A of the upper punch 215 for final molding, and thus, the green compact P for a cutting insert is finally molded.

In addition, even before the upper punch 215 for final molding is lowered, if the lower punch 212 is lowered such that the upper surface of the refilled raw material powder R moves backward so as to be located at a position lower than that of the upper surface 211C of the die 211, it is possible to prevent the raw material powder R from overflowing from the hole portion 211A. In addition, the circular surface 215B of the upper surface molding surface 215A abuts on the upper end surface 213A of the pin 213 while the upper punch 215 for final molding is lowered, and thereafter, as shown in FIG. 21, the pin 213 is lowered together with the upper punch 215 for final molding, and thus, the powder molding press is performed.

Moreover, in this way, if the green compact P for a cutting insert is finally molded, the upper punch 215 for final molding is raised to be pulled out from the hole portion 211A of the die 211, and next, as shown in FIGS. 22 and 23, the lower punch 212 is raised such that the lower surface molding surface 212A protrudes from the upper surface 211C of the die 211, and thereafter, the finally molded green compact P for a cutting insert is taken out. In this way, the finally molded green compact P for a cutting insert is sintered, and thus, the cutting insert shown in FIGS. 1 to 3 is manufactured.

In this way, according to the powder molding press method and the powder molding press device of the green compact P for a cutting insert configured as described above, before the raw material powder R is powder-molding-pressed between the lower surface molding surface 212A of the lower punch 212 and the upper surface molding surface 215A of the upper punch 215 for final molding to finally mold the green compact P for a cutting insert, the upper punch 214 for preliminary molding having the preliminary molding surface 214B which has the direction of the unevenness opposite to that of the shape obtained by inverting the upper surface P2 of the finally molded green compact P for a cutting insert in plane symmetry, that is, has the direction of the unevenness opposite to that of the upper surface molding surface 215A of the upper punch 215 for final molding is inserted into the molding space Q, and thus, the finally filled raw material powder R is performed the preliminary molding.

According to the preliminary molding, as described above, in a depth of the upper surface of the raw material powder R in the molding space Q, the thick portion between the upper and lower surfaces P2 and P3 in the green compact P for a cutting insert in the direction of the insert center line PO is deeper than the thin portion. Therefore, a space above the raw material powder R after the step of performing the preliminary molding is refilled with the raw material powder R, and thus, the portion where the upper surface of the raw material powder R initially filled to be performed the preliminary molding becomes deeper, that is, the thick portion between the upper and lower surfaces P2 and P3 of the green compact P for a cutting insert in the direction of the insert center line PO is refilled with more raw material powder R than the thin portion therebetween, relative to the state before the step of performing the preliminary molding.

Accordingly, in this way, when the raw material powder R after the step of performing the preliminary molding and the refilled raw material powder R are powder-molding-pressed to the green compact P for a cutting insert having a predetermined dimension and shape by the upper punch 215 for final molding and the lower punch 212, the thick portion between the upper and lower surfaces P2 and P3 in the direction of the insert center line PO is filled with more raw material powder R, the thin portion is filled with the raw material powder R smaller than the raw material powder R filling the thick portion, and thus, in the green compact P for a cutting insert which is finally powder-molding-pressed, the density of the raw material powder R can be made uniform.

Accordingly, in the cutting insert which is manufactured by sintering the green compact P for a cutting insert which is powder-molding-pressed in this way, it is possible to limit the occurrence of strain or deformation of the insert body 1. Therefore, even when the upper and lower surfaces 2 and 3 of the insert body 1 are largely uneven and the thicknesses between the upper and lower surfaces 2 and 3 are partially different from each other, it is possible to manufacture the cutting insert having high precision.

Moreover, in the present embodiment, the preliminary molding surface 214B of the upper punch 214 for preliminary molding is provided with the inclined surface 214C. The inclined surface 214C protrudes downward from the portion performing the preliminary molding to the thin portion between the upper and lower surfaces P2 and P3 in the green compact P for a cutting insert in the direction of the insert center line PO toward the portion performing the preliminary molding to the thick portion and is formed between the portions, and thus, the raw material powder R filled in advance by the inclined surface 214C is compressed and performed the preliminary molding between the portions.

Accordingly, in the upper surface of the raw material powder R performed the preliminary molding by the inclined surface 214C, it is possible to prevent a step or the like from occurring from the thick portion between the upper and lower surfaces P2 and P3 in the green compact P for a cutting insert in the direction of the insert center line PO toward the thin portion, and it is possible to mold the green compact P for a cutting insert having a reliably uniform density.

Moreover, in the present embodiment, the inclined surface 214C has a substantially conical surface shape and a cross section thereof along the insert center line PO is linear. However, for example, the cross section of the inclined surface 214C along the insert center line PO may have a convex curve shape or a recessed curve shape and may be performed the preliminary molding. In addition, the conical surface described in the embodiment and the convex curve shaped cross section or the recessed curved shaped surface may be combined with each other to form the inclined surface 214C.

Moreover, in the present embodiment, as shown in FIGS. 1 to 3, the case is described in which the green compact P for a cutting insert manufactured to the negative type cutting insert including the insert body 1 having the uneven hexagonal plate shape is powder-molding-pressed. However, the shape of the insert body 1 or the green compact P for a cutting insert is not limited, and the present invention can be applied to a case where the green compact P for a cutting insert manufactured to a positive type cutting insert is powder-molding-pressed. In addition, the preliminary molding may be performed multiple times, and the refilling of the raw material powder R may be performed during the multiple preliminary molding.

Industrial Applicability

According to the present embodiment, even in a case where a cutting insert having largely uneven upper and lower surfaces and a partially different thickness in a direction of an insert center line is sintered and manufactured, a density of a raw material powder in the direction of the insert center line in a green compact for a cutting insert is uniform, it is possible to limit the occurrence of strain or deformation, and it is possible to manufacture a cutting insert having high precision and high quality.

Reference Signs List

1: insert body
2, P2: upper surface
3, P3: lower surface
4, P4: side surface
5, P5: fitting hole
6, P6: corner edge
7, P7: primary cutting edge
8, P8: secondary cutting edge
111: die
111A: hole portion
111B: side surface molding surface
111C: upper surface of die 111
112: lower punch
112A: lower surface molding surface
113: pin
114: upper punch for preliminary molding
114B: preliminary molding surface
114C: inclined surface
115: upper punch for final molding
115A: upper surface molding surface
O, PO: insert center line
C1, PC1: first corner portion
C2, PC2: second corner portion
P: green compact for cutting insert
Q: molding space
R: raw material powder
211: die
211A: hole portion
211B: side surface molding surface
211C: upper surface of die 211
212: lower punch
212A: lower surface molding surface
213: pin
214: upper punch for preliminary molding
214B: preliminary molding surface
214C: inclined surface
215: upper punch for final molding
215A: upper surface molding surface

The invention claimed is:

1. A powder molding press method of a green compact to be sintered to obtain a cutting insert including an upper and lower surfaces substantially perpendicular to an insert center line of the cutting insert and a side surface disposed around the upper and lower surfaces and having different thicknesses between the upper and lower surfaces locally, the insert center line pass through a center of the insert and parallel to a thickness direction of the insert, the method comprising the steps of:
   inserting from below a lower punch having a lower-surface molding-surface as an upper end surface into a hole portion of a die having a side-surface molding-surface as an inner peripheral surface,
   filling a molding space formed by the lower-surface molding-surface and the side-surface molding-surface with a raw material powder of the green compact, the lower-surface molding-surface and the side-surface molding-surface being configured to mold a lower surface and a side surface of the green compact, respectively;
   performing a preliminary molding by inserting a first upper punch for preliminary molding including a preliminary molding-surface as a lower end surface into the molding space from above, the preliminary molding-surface having a shape different from a shape obtained by inverting a shape of the upper surface of the cutting insert in plane symmetry and being configured to preliminary mold the upper surface of the raw material powder filled in the molding space, more raw material powder being filled in thick portions than thin portions between the preliminary molding-surface and the lower-surface molding-surface by performing the preliminary molding, wherein the preliminary molding-surface of the first upper punch is provided with an inclined surface protruding downward toward one of the thin portions, and the thick portions are filled with more raw material powder than the thin portions by the insertion of the first upper punch by guiding the raw material powder from the thin portions to the thick portions by the inclined surface, each of the thick portions and the thin portions being arranged alternately along the side surface of the green compact; and
   inserting a second upper punch for final molding having an upper-surface molding-surface into the molding space from above, the upper-surface molding-surface is configured to mold the upper surface of the raw material powder after the step of performing a preliminary molding, and the raw material powder after the step of performing a preliminary molding being pressed and molded into the green compact that have a substantially same shape as the cutting insert, wherein
   in the thin portions, a downward protrusion amount of the preliminary molding-surface of the first upper punch is larger than a downward protrusion amount of the upper-surface molding-surface of the second upper punch.

2. The powder molding press method of claim 1, wherein directions of downward protrusions and recesses in the preliminary molding-surface are opposite to directions of downward protrusions and recesses in a shape obtained by inverting the upper surface of the green compact in plane symmetry,
   the preliminary molding-surface of the first upper punch is provided with an inclined surface protruding downward toward one of the thick portions from one of the thin portions, and extent of compression in the thin portions in the step of performing a preliminary molding is less than extent of compression in the thick portions, and
   the powder molding press method further comprises the step of refilling a space above the raw material powder after the step of performing the preliminary molding with a refilling raw material powder in such way that the thick portions are filled with more raw material powder and the refilling raw material powder as a total than the thin portions, wherein the thick portions are refilled with more refilling raw material powder than the thin portions by compressing the raw material powder in the step of performing a preliminary molding by the inclined surface, a space above the raw material in the thin portions after the step of performing the preliminary molding is smaller than a space above the raw material in the thick portions after the step of performing the preliminary molding the raw material powder molded in the step of performing a preliminary molding and the refilling raw material powder refilled in the step of refilling are pressed and molded into the green compact.

\* \* \* \* \*